(12) United States Patent
Mibu

(10) Patent No.: US 10,454,708 B2
(45) Date of Patent: Oct. 22, 2019

(54) NETWORK SYSTEM, INTER-SITE NETWORK COOPERATION CONTROL APPARATUS, NETWORK CONTROL METHOD, AND PROGRAM

(71) Applicant: NEC Corporation, Tokyo (JP)

(72) Inventor: Ryota Mibu, Tokyo (JP)

(73) Assignee: NEC Corporation, Tokyo (JP)

( * ) Notice: Subject to any disclaimer, the term of this patent is extended or adjusted under 35 U.S.C. 154(b) by 320 days.

(21) Appl. No.: 15/122,535

(22) PCT Filed: Feb. 24, 2015

(86) PCT No.: PCT/JP2015/055158
§ 371 (c)(1),
(2) Date: Aug. 30, 2016

(87) PCT Pub. No.: WO2015/133327
PCT Pub. Date: Sep. 11, 2015

(65) Prior Publication Data
US 2017/0078114 A1 Mar. 16, 2017

(30) Foreign Application Priority Data
Mar. 7, 2014 (JP) .................................. 2014-045675

(51) Int. Cl.
*G06F 15/177* (2006.01)
*H04L 12/46* (2006.01)
(Continued)

(52) U.S. Cl.
CPC ...... *H04L 12/4633* (2013.01); *H04L 12/4641* (2013.01); *H04L 12/6418* (2013.01); *H04L 41/0803* (2013.01); *H04L 41/0873* (2013.01)

(58) Field of Classification Search
CPC .............. H04L 45/586; H04L 12/4641; H04L 41/0803; H04L 63/0272
See application file for complete search history.

(56) References Cited

U.S. PATENT DOCUMENTS 6,662,221 B1 * 12/2003 Gonda ................ H04L 12/4641
370/254
6,671,729 B1 * 12/2003 Gordon ............... H04L 12/4633
709/203
(Continued)

FOREIGN PATENT DOCUMENTS

JP 2008-187236 A 8/2008
JP 2009-245409 A 10/2009
(Continued)

OTHER PUBLICATIONS

International Search Report corresponding to PCT/JP2015/055158, dated May 19, 2015, 1 page.
(Continued)

*Primary Examiner* — Razu A Miah
(74) *Attorney, Agent, or Firm* — Wilmer Cutler Pickering Hale and Dorr LLP

(57) ABSTRACT

Provided an inter-site network cooperation control apparatus connected to a network control apparatus in each of extension source and extension destination site of a virtual network that receives an extension request from the network control apparatus, notifies the network control apparatus in the extension destination site of an instruction to create a virtual network in the extension destination site, and notifies the network control apparatuses in the extension destination site and the extension source site of an instruction to create virtual ports for a tunnel between the sites, thus a communication connection being established between the virtual networks in the sites via the tunnel between the virtual ports for a tunnel.

9 Claims, 13 Drawing Sheets

(51) Int. Cl.
*H04L 12/64* (2006.01)
*H04L 12/24* (2006.01)

(56) References Cited

U.S. PATENT DOCUMENTS

| | | | | |
|---|---|---|---|---|
| 6,931,016 | B1* | 8/2005 | Andersson | H04L 12/4679 370/260 |
| 7,272,643 | B1* | 9/2007 | Sarkar | H04L 12/4641 370/392 |
| 7,444,398 | B1* | 10/2008 | Matthews | H04L 29/06 370/395.21 |
| 7,574,495 | B1* | 8/2009 | Rajagopalan | H04L 12/4641 370/392 |
| 7,953,865 | B1* | 5/2011 | Miller | H04L 12/6418 370/254 |
| 8,108,525 | B2 | 1/2012 | Kumar | H04L 12/4641 709/227 |
| 8,230,050 | B1* | 7/2012 | Brandwine | H04L 45/586 709/220 |
| 8,578,003 | B2 | 11/2013 | Brandwine et al. | |
| 8,762,447 | B2* | 6/2014 | Oren-Dahan | H04L 63/029 709/203 |
| 9,692,713 | B2* | 6/2017 | Saavedra | H04L 49/00 |
| 2002/0026503 | A1* | 2/2002 | Bendinelli | H04L 12/4641 709/220 |
| 2002/0069278 | A1* | 6/2002 | Forslow | H04L 63/0227 709/225 |
| 2003/0225854 | A1* | 12/2003 | Zhang | G06F 21/10 709/217 |
| 2005/0022015 | A1* | 1/2005 | Van Den Heuvel | G06F 21/10 726/4 |
| 2005/0144072 | A1* | 6/2005 | Perkowski | G06Q 30/02 705/14.49 |
| 2005/0193103 | A1* | 9/2005 | Drabik | H04L 63/0272 709/221 |
| 2007/0204339 | A1* | 8/2007 | Bou-Diab | H04L 63/0272 726/15 |
| 2008/0034057 | A1* | 2/2008 | Kumar | H04L 12/4641 709/217 |
| 2010/0125903 | A1* | 5/2010 | Devarajan | G06F 21/577 726/15 |
| 2010/0246443 | A1* | 9/2010 | Cohn | H04L 12/4641 370/255 |
| 2010/0281251 | A1* | 11/2010 | Arauz Rosado | H04L 12/4641 713/152 |
| 2011/0060902 | A1* | 3/2011 | Nagata | H04L 12/4641 713/155 |
| 2012/0002813 | A1* | 1/2012 | Wei | H04L 63/0272 380/270 |
| 2012/0005746 | A1* | 1/2012 | Wei | H04L 63/0272 726/15 |
| 2012/0016955 | A1* | 1/2012 | Twitchell, Jr. | H04L 45/586 709/217 |
| 2012/0017006 | A1* | 1/2012 | Twitchell | H04L 45/586 709/232 |
| 2012/0079122 | A1* | 3/2012 | Brown | H04L 12/4641 709/227 |
| 2012/0106559 | A1* | 5/2012 | Kim | H04L 45/586 370/401 |
| 2012/0311108 | A1 | 12/2012 | Brandwine et al. | |
| 2013/0133057 | A1* | 5/2013 | Yoon | G06F 21/00 726/12 |
| 2013/0204971 | A1 | 8/2013 | Brandwine et al. | |
| 2013/0282867 | A1* | 10/2013 | Otake | H04L 12/4641 709/217 |
| 2013/0332602 | A1* | 12/2013 | Nakil | G06N 99/005 709/224 |
| 2014/0047082 | A1 | 2/2014 | Brandwine et al. | |
| 2014/0123270 | A1* | 5/2014 | Liu | H04L 12/467 726/15 |

FOREIGN PATENT DOCUMENTS

| | | |
|---|---|---|
| JP | 2012-511878 A | 5/2012 |
| JP | 2013-157855 A | 8/2013 |
| WO | WO-2012/090996 A1 | 7/2012 |

OTHER PUBLICATIONS

Github, Inc. "Sliceable Switch Tutorial", https://github.com/trema/apps/wiki/sliceable_switch_tutorial, 22 pages, Sep. 6, 2013.
OpenStack "OpenStack Compute API v2 and Extensions Reference", API v2 (Jul. 24, 2013), 138 pages.

* cited by examiner

FIG. 4A

| VIRTUAL NETWORK ID | NAME |
|---|---|
| 0x1 | Network 1 |

FIG. 4B

| VIRTUAL PORT ID | NAME | VIRTUAL NETWORK ID |
|---|---|---|
| 0x1 | Port 51A | 1 |
| 0x2 | Port 52A | 1 |
| 0x3 | Tunnel Port 53A (Net A:0x1 to Net B:0x1) | 1 |

FIG. 4C

| VIRTUAL PORT ID | SWITCH IDENTIFICATION INFORMATION (DPID) | PORT NUMBER |
|---|---|---|
| 0x1 | 0xa001 | 1 |
| 0x3 | 0xa002 | 3 |

FIG. 5A

| VIRTUAL NETWORK ID | NAME |
|---|---|
| 0x1 | Network 1 (Net A:0x1) |

FIG. 5B

| VIRTUAL PORT ID | NAME | VIRTUAL NETWORK ID |
|---|---|---|
| 0x1 | Tunnel Port 51B (Net B:0x1 to Net A:0x1) | 1 |
| 0x2 | Port 52B (Port A:0x1) | 1 |

FIG. 5C

| VIRTUAL PORT ID | SWITCH IDENTIFICATION INFORMATION (DPID) | PORT NUMBER |
|---|---|---|
| 0x1 | 0xb001 | 1 |
| 0x2 | 0xb002 | 2 |

FIG. 6A

| EXTENSION ID | EXTENSION SOURCE SITE ID | EXTENSION SOURCE VIRTUAL NETWORK ID | EXTENSION DESTINATION SITE ID | EXTENSION DESTINATION VIRTUAL NETWORK ID |
|---|---|---|---|---|
| A1B1 | A | 0x1 | B | 0x1 |

FIG. 6B

| EXTENSION ID | EXTENSION SOURCE SITE ID | EXTENSION SOURCE VIRTUAL PORT ID | EXTENSION DESTINATION SITE ID | EXTENSION DESTINATION VIRTUAL PORT ID |
|---|---|---|---|---|
| A1B1 | A | 0x2 | B | 0x2 |

FIG. 6C

| EXTENSION ID | SITE ID | ID OF VIRTUAL PORT FOR TUNNEL |
|---|---|---|
| A1B1 | A | 0x3 |
| A1B1 | B | 0x1 |

FIG. 7A

| NETWORK CONTROL APPARATUS IDENTIFIER | SITE ID |
|---|---|
| 10.10.0.2 | A |
| 10.11.0.2 | B |

FIG. 7B

| EXTENSION SOURCE NETWORK CONTROL APPARATUS IDENTIFIER | 10.10.0.2 |
|---|---|
| EXTENSION SOURCE VIRTUAL NETWORK ID | 0x1 |
| EXTENSION SOURCE VIRTUAL PORT ID | 0x2 |
| PORT INFORMATION (SWITCH IDENTIFIER) | 0xb002 |
| PORT INFORMATION (PORT NUMBER) | 2 |

FIG. 7C

| EXTENSION SOURCE NETWORK CONTROL APPARATUS IDENTIFIER | 10.10.0.2 |
|---|---|
| EXTENSION SOURCE VIRTUAL NETWORK ID | 0x1 |
| EXTENSION SOURCE VIRTUAL PORT ID | 0x2 |

FIG. 9A

| EXTENSION SOURCE NETWORK CONTROL APPARATUS IDENTIFIER | 10.10.0.2 |
|---|---|
| EXTENSION DESTINATION NETWORK CONTROL APPARATUS IDENTIFIER | 10.11.0.2 |
| EXTENSION SOURCE VIRTUAL NETWORK ID | 0x1 |
| EXTENSION SOURCE VIRTUAL PORT ID | 0x2 |
| PORT INFORMATION (SWITCH IDENTIFIER) | 0xb002 |
| PORT INFORMATION (PORT NUMBER) | 2 |

FIG. 9B

| EXTENSION SOURCE NETWORK CONTROL APPARATUS IDENTIFIER | 10.10.0.2 |
|---|---|
| EXTENSION DESTINATION NETWORK CONTROL APPARATUS IDENTIFIER | 10.11.0.2 |
| EXTENSION SOURCE VIRTUAL NETWORK ID | 0x1 |
| EXTENSION SOURCE VIRTUAL PORT ID | 0x2 |

FIG. 11A

| VIRTUAL NETWORK ID | VLAN NUMBER |
|---|---|
| 0x1 | 10 |

FIG. 11B

| EXTENSION SOURCE NETWORK CONTROL APPARATUS IDENTIFIER | 10.10.0.2 |
|---|---|
| EXTENSION DESTINATION NETWORK CONTROL APPARATUS IDENTIFIER | 10.11.0.2 |
| EXTENSION SOURCE VIRTUAL NETWORK ID | 0x1 |
| EXTENSION SOURCE VIRTUAL PORT ID | 0x2 |

NETWORK SYSTEM, INTER-SITE NETWORK COOPERATION CONTROL APPARATUS, NETWORK CONTROL METHOD, AND PROGRAM

REFERENCE TO RELATED APPLICATION

This application is a national stage application of International Application No. PCT/JP2015/055158 entitled "NETWORK SYSTEM, INTER-SITE NETWORK COOPERATION CONTROL APPARATUS, NETWORK CONTROL METHOD, AND PROGRAM," filed on Feb. 24, 2015, which claims the benefit of the priority of Japanese Patent Application No. 2014-045675 filed on Mar. 7, 2014, the disclosures of each of which are hereby incorporated by reference in their entirety.

TECHNICAL FIELD

The present invention relates to a network system, inter-site network cooperation control apparatus, network control method, and program.

BACKGROUND

In recent years, there have been provided cloud infrastructure (also called as IaaS (Infrastructure as a Service)) that provides computing resources (such as storage, computer, etc.) and network resources as virtual resources to users via, for instance. As it is well known, with a cloud infrastructure platform, scale-out/in of virtual machines (VM) and configuration of a virtual network can be performed flexibly. Therefore, a user can dynamically configure virtual machines and a virtual network on a cloud infrastructure according to required specification, load and so forth on a user side system. As a result, it makes possible to achieve and operate a system having necessary and sufficient processing performance corresponding to load on a user side. A virtual machine (VM) is implemented on a virtualization mechanism (hypervisor or Virtual Machine Monitor (VMM)) that realizes the virtualization of a server (virtual machine server). By means of network virtualization (for instance NVF (Network Function Virtualization)), virtual networks are used for communication connection between a virtual machines and an external node, communication between virtual machines on a virtual machine server, and communication connection between a virtual machine and a management OS (Operating System).

A service control system that provides desired services to users by controlling virtual machines, virtual networks, and service components on each virtual machine is known. Here, the service components on a virtual machine are service components (for instance components such as software components corresponding to the functions required by an application) implemented on and functioning on a virtual machine. Patent Literature 1 discloses a system in which technology layers (combination of a physical machine, a virtual machine, an operating system, etc.) can be automatically configured to meet a resource request that is input by a user.

In a typical service control system of the related technology, for instance, addition and deletion of virtual machines and setting of configuration of a virtual network are manipulated using an API (Application Programming Interface) of a cloud infrastructure. In this service control system, a user can freely configure a network by designating a virtual port to connect a virtual machine to the created virtual network (refer to "2.1.2.3 Server Networks" of Non-Patent Literature 1). This service is realized by a virtual network service. For instance, as a service provided by the virtual network service, a network infrastructure service of a network equipment(s) (for instance router, firewall, load balancer, etc.) can be provided to a user as an on-demand service, though not limited thereto.

As a service provided by a virtual network service, for instance, for a user, a service control system, and a virtual machine service, a network equipment and a machine (server) on which a virtual machine(s) operate are set up basically only by manipulation of a virtual network and ports. For instance, a network can be configured so that communication is possible only between virtual ports belonging to the same virtual network. In a virtual machine service, for instance, virtual machines in a cloud resource or a data center are made available to a user, and the specification of a virtual machine can be changed. A virtual machine is logically connected to a port of a virtual network.

As a technology for achieving a virtual network service, there is a network virtualization technology using OpenFlow. For instance, Patent Literature 3 discloses a configuration in which a virtual network is provided by having a control apparatus operate an OpenFlow switch as a virtual node. Further, in Non-Patent Literature 2, there is description that a virtual network can be constructed with a combination of the OpenFlow switch and an OpenFlow controller called "sliceable switch," and also description regarding setting by associating a virtual network with ports called "port-based binding". In Non-Patent Literature 2, the port is specified by a switch ID, a port number in a switch, and VLAN ID (Virtual Local Area Network ID). The sliceable switch is a controller used when a network constituted by OpenFlow switches is used with the network being divided into a plurality of L2 (Layer 2) domains (slices). The OpenFlow switch compares predetermined information of the header of a received packet with the matching pattern of a flow entry, performs the operation (processing) defined in the corresponding action in the flow entry if they match, and sends the received packet to the sliceable switch that is a controller, using a Packet_In message if they do not match. Upon reception of the packet_In message, the sliceable switch performs, for instance, the following processing.

Determine an egress switch and port on the basis of the destination MAC address of the packet.

When the determined port and switch belong to the same slice as the slice to which the port that received the packet belongs, calculate the shortest path from the switch that received the packet to the egress switch, and set a flow for each switch on the path using a Flow Mod message.

Send the received packet to the egress switch using a Packet_Out message (forwarding instruction message) in order to have the received packet outputted from the determined port. Note that, with a port-based binding, a host ID, data path ID, port number, and VLAN ID are included for each slice.

For instance, a virtual network is utilized for communication between service components. In general, a virtual network is not connected to an external network or to the Internet in view of security concerns.

In general, a virtual network service in a cloud infrastructure is provided on a per site basis, as a result of which, when constructing a system straddling different sites, a user uses a VPN (Virtual Private Network) to make a virtual network connection between the sites. An inter-site VPN is realized by making a routing connection between private networks of different sites via a public network such as the Internet while securing security. In a VPN connection via the Internet, a site router (also known as "VPN device") forwards a packet to a router (VPN device) in another site via the VPN connection. Further, in an inter-site VPN, by means of tunneling in which a plurality of communications between terminals within a site are put together to make them look like a communication between routers (VPN devices), encryption processing on the sender's side and decryption processing on the receiver's side are aggregated and performed by the routers (VPN device).

Patent Literature 2 describes a method that includes a step of starting the availability of access to a first private computer network from at least one remote computing system of a first client. In Patent Literature 2, a configurable network service provides a user who is a client of the service with secure private access to a computer network provided for the client by enabling a VPN (Virtual Private Network) connection or another secure connection between at least one remote computing system of the client and the provided computer network, or enables the client to remotely interact with the provided computer network in a private and secure manner using other security and/or authentication techniques. Patent Literature 4 discloses a configuration in which a virtual port is defined for each of a plurality of logical channels corresponding to connected sites for a physical line in a wide area network connecting different sites, and routing is performed so that transmitted data is assigned to the defined virtual port when the data is transmitted to another site. In Patent Literature 4, the configuration or deletion of a logical channel on the network's side triggers the generation or deletion of a virtual port, and routing is performed with a logical channel on the network's side as a virtual router port.

[Patent Literature 1]
Japanese Patent Kokai Publication No. JP2009-245409A
[Patent Literature 2]
Japanese Patent Kohyo Publication No. JP2012-511878A
[Patent Literature 3]
International Publication No. WO2012/090996
[Patent Literature 4]
Japanese Patent Kokai Publication No. JP2008-187236A Non Patent Literature

[Non Patent Literature 1]
"OpenStack Compute API v2 and Extensions Reference"
[Non Patent Literature 2]
"Sliceable Switch Tutorial," [online], [searched on Sep. 6, 2013], the Internet <URL: https://github.com/trema/apps/wiki/sliceable_switch_tutorial>

SUMMARY

An analysis of the related technologies is given below.

As described above, when service components are provided across sites, a virtual network is connected between different sites via a VPN as necessary. This type of operation is performed taking the physical configuration (the configuration of physical resources, etc. controlled by the virtual network) of the sites into consideration. As a result, the functions (for instance an automatic setting function, etc.) of the virtual network service, i.e., the convenience thereof, may be lost.

Further, let's consider a system (reference example) in which a virtual network service exists in each site, and a network and ports virtually defined in a first site are provided in a second site, which is different from the first site. In this system, since the physical resources controlled by the virtual network are in the second site, the virtual networks of the first and the second sites must be connected after the system administrator has associated information across the sites (making a configuration so that, for instance, the virtual networks and the physical resources are associated across the sites).

The present invention is created so as to solve the problems described above, and it is an object thereof to provide a system, apparatus, method, and program enabling the simplification and labor-saving of the configuration of a virtual network extending across sites.

According to a first aspect of the present invention, there is provided a network system (inter-site network cooperation control system) comprising a plurality of sites, each of the sites including: a network control apparatus that provides a virtual network service; and a tunnel apparatus that performs tunneling between sites with a corresponding tunnel apparatus in another site; and an inter-site network cooperation control apparatus that connects at least to the network control apparatus in an extension source site of a virtual network and the network control apparatus in an extension destination site thereof, wherein the network control apparatus in the extension source site or in the extension destination site notifies an extension request to the inter-site network cooperation control apparatus, upon detection of an extension of a virtual network across sites in response to an operation performed on a network configuration including at least one of a virtual network and a virtual port that is a port on a logical configuration of the virtual network, wherein the inter-site network cooperation control apparatus, upon reception of the extension request, notifies the network control apparatus in the extension destination site of an instruction to create a virtual network in the extension destination site, necessary for configuring the extension of a virtual network across sites, and further notifies each of the network control apparatuses in the extension destination site and the extension source site of an instruction to create a virtual port for a tunnel between sites, and wherein virtual networks in the extension source site and the extension destination site are communicatively connected via the virtual ports for a tunnel between sites that are created in the tunnel apparatuses in respective sites, and the tunnel between the sites.

According to a second aspect, there is provided a network control method comprising:

providing an inter-site network cooperation control apparatus that connects at least to a network control apparatus in an extension source site of a virtual network and a network control apparatus in an extension destination site thereof, each site including at least the network control apparatus that provides a virtual network service and a tunnel apparatus that provides tunneling between sites with a corresponding tunnel apparatus in another site;

notifying an extension request to the inter-site network cooperation control apparatus by the network control apparatus in the extension source site, upon detection of an extension of a virtual network across sites in response to an operation performed on a network configuration including at least one of a virtual network and a virtual port that is a port on a logical configuration of the virtual network;

notifying, by the inter-site network cooperation control apparatus, the network control apparatus in the extension destination site of an instruction to create a virtual network in the extension destination site, necessary for configuring the extension of a virtual network across sites, based on the extension request, and further notifying, by the inter-site network cooperation control apparatus, the network control apparatuses in the extension destination site and the extension source site of an instruction to create virtual ports for a tunnel between sites; and establishing a communication connection between virtual networks in the extension source site and the extension destination site via the virtual ports for tunnel between sites that are created in the tunnel apparatuses in respective sites and the tunnel between the sites.

According to a third aspect of the present invention, there is provided an inter-site network cooperation control apparatus comprising: a unit that connects at least to a network control apparatus in each of an extension source site and an extension destination site of a virtual network; and a logical network extension unit that is configured to notify the network control apparatus in the extension destination site of an instruction to create a virtual network in the extension destination site, determined to be necessary for configuring the extension of a virtual network across sites, on the basis of an extension request issued from the network control apparatus in the extension source site or the extension destination site that detects an extension of a virtual network across sites in response to an operation performed on a network configuration including at least one of a virtual network and a virtual port that is a port on a logical configuration of the virtual network, and for further notify the network control apparatuses in the extension destination site and the extension source site of an instruction to create virtual ports for a tunnel between sites.

According to a fourth aspect of the present invention, there is provided a network control apparatus arranged in each of a plurality of sites, for providing a virtual network service, the network control apparatus comprising:

a unit to connect to the network control apparatus in another site via an inter-site network cooperation control apparatus that is adapted to connect at least to the network control apparatus in an extension source site of a virtual network and the network control apparatus in an extension destination site thereof, the inter-site network cooperation control apparatus notifying the network control apparatus in the extension destination site of an instruction to create a virtual network in the extension destination site, necessary for configuring the extension of a virtual network across the extension source and extension destination sites and notifying each of the network control apparatuses in the extension destination and the extension source sites of an instruction to create a virtual port for a tunnel between sites;

a logical configuration holding unit that holds information related to affiliation of a virtual network and a virtual port;

a configuration detection unit that determines whether an operation on the network configuration corresponds to a process within the site thereof or extension process of a virtual network to another site, by referring to the information held in the logical configuration holding unit, and that notifies the inter-site network cooperation control apparatus of an extension request when determined to be the extension process of a virtual network to another site; and a network equipment setting unit that sets up one or more network equipments within a site, the network equipment setting unit creating a virtual port for a tunnel between the extension destination and extension source sites, based on the instruction to create a virtual port for a tunnel between sites, the instruction received from the inter-site network cooperation control apparatus.

According to a fifth aspect of the present invention, there is provided a program causing a computer constituting an inter-site network cooperation control apparatus connected between sites and connected to a network control apparatus in each of the sites to execute the processing comprising:

receiving an extension request issued from the network control apparatus in an extension source site, upon detection of an extension of a virtual network across sites in response to an operation performed on a network configuration including at least one of a virtual network and a virtual port that is a port on a logical configuration of the virtual network;

notifying the network control apparatus in the extension destination site of an instruction to create a virtual network in the extension destination site, determined to be necessary for configuring the extension of a virtual network across sites; and notifying the network control apparatuses in the extension destination site and the extension source site of an instruction to create virtual ports for a tunnel between sites. This program may be stored in, for instance, a non-transitory computer-readable storage medium such as semiconductor memory and magnetic/optical storage. That is, the present invention can be also realized as a computer program product.

According to the present invention, facilitation and labor-saving of setting operation of a virtual network extending across sites is made possible. Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIG. 4A is a diagram showing an example of virtual network information in a site A in the first exemplary embodiment of the present invention.

FIG. 4B is a diagram showing an example of virtual port information in the site A in the first exemplary embodiment of the present invention.

FIG. 4C is a diagram showing an example of port information in the site A in the first exemplary embodiment of the present invention.

FIG. 5A is a diagram showing an example of virtual network information in a site B in the first exemplary embodiment of the present invention.

FIG. 5B is a diagram showing an example of virtual port information in the site B in the first exemplary embodiment of the present invention.

FIG. 5C is a diagram showing an example of port information in the site B in the first exemplary embodiment of the present invention.

FIG. 6A is a diagram showing an example of virtual network extension information in the first exemplary embodiment of the present invention.

FIG. 6B is a diagram showing an example of virtual port extension information in the first exemplary embodiment of the present invention.

FIG. 6C is a diagram showing an example of information of virtual ports for a tunnel in the first exemplary embodiment of the present invention.

FIG. 7A is a diagram showing an example of network control apparatus information and site information in the first exemplary embodiment of the present invention.

FIG. 7B is a diagram showing an example of an extension request in the first exemplary embodiment of the present invention.

FIG. 7C is a diagram showing an example of an extension release request in the first exemplary embodiment of the present invention.

FIG. 9A is a diagram showing an example of an extension request in the second exemplary embodiment of the present invention.

FIG. 9B is a diagram showing an example of an extension release request in the second exemplary embodiment of the present invention.

FIG. 11A is a diagram showing an example of virtual network information in the sites A and B in the third exemplary embodiment of the present invention.

FIG. 11B is a diagram showing an example of an extension request in the third exemplary embodiment of the present invention.

DETAILED DESCRIPTION

Figure 13:
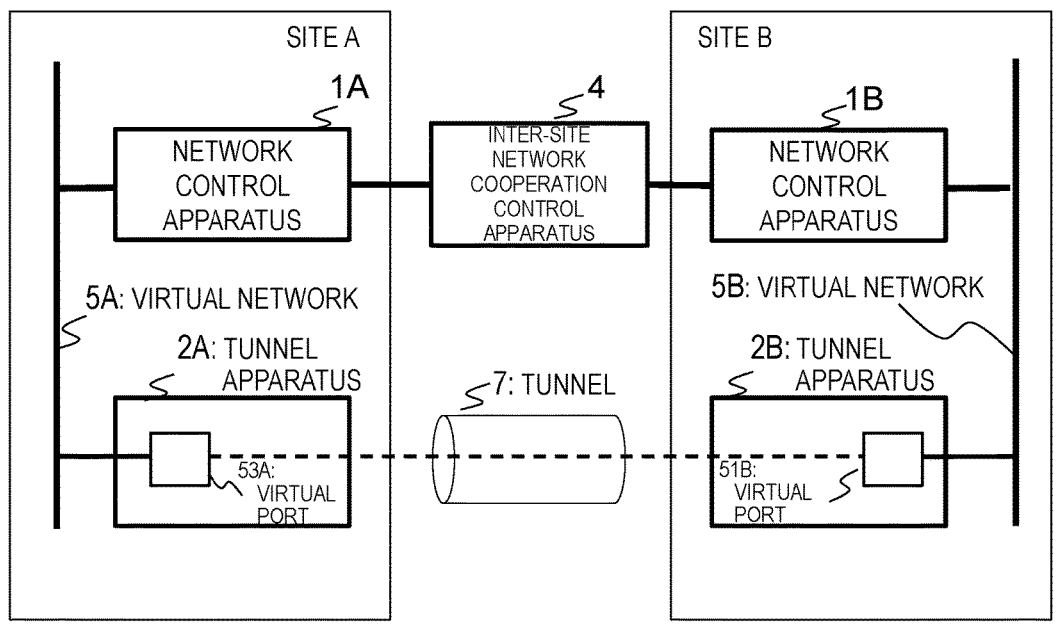
FIG. 13 is a diagram schematically illustrating the basic concept of the disclosure of the present application.

An outline of exemplary embodiments (basic concept) will be given with reference to the drawings. Note that drawing reference signs in this outline are given to each element as an example solely to facilitate understanding for convenience and are not intended to limit the present invention to the modes shown in the drawings. According to some preferred aspects, in FIG. 13, each site (sites A and B) includes a network control apparatus (1A and 1B) that provides a virtual network service, and a tunnel apparatus (2A and 2B) that performs tunneling between sites with a corresponding tunnel apparatus (2B and 2A) in another site. There is provided an inter-site network cooperation control apparatus (4) that connects at least the network control apparatus (1A or 1B) in an extension source site (A or B) of a virtual network and the network control apparatus (1A or 1B) in an extension destination site (A or B).

In response to an operation related to a configuration of the virtual network and/or a virtual port, which is a port on a logical configuration of the virtual network, the network control apparatus (for instance 1A) in the extension source site or the network control apparatus (for instance 1B) in the extension destination site detects the extension of the virtual network across sites.

The network control apparatus (for instance 1A) in the extension source site or the network control apparatus (for instance 1B) in the extension destination site transmits an extension request to the inter-site network cooperation control apparatus (4).

Upon reception of the extension request, the inter-site network cooperation control apparatus (4) notifies the network control apparatus (for instance 1B) in the extension destination site of an instruction to create a virtual network (for instance 5B) in the extension destination site, necessary for configuring the extension of a virtual network across sites.

Further, the inter-site network cooperation control apparatus (4) notifies the network control apparatus (for instance 1B) in the extension destination site and the network control apparatus (for instance 1A) in the extension source site of an instruction to create virtual ports (51B and 53A) for a tunnel between sites. A virtual network (for instance 5A) in the extension source site and the virtual network (for instance 5B) in the extension destination site are connected via the virtual ports (53A and 51B) for the tunnel between sites created in the tunnel apparatus (2A and 2B) in each site and the tunnel (7) between the sites to communicate with each other.

Figure 3:
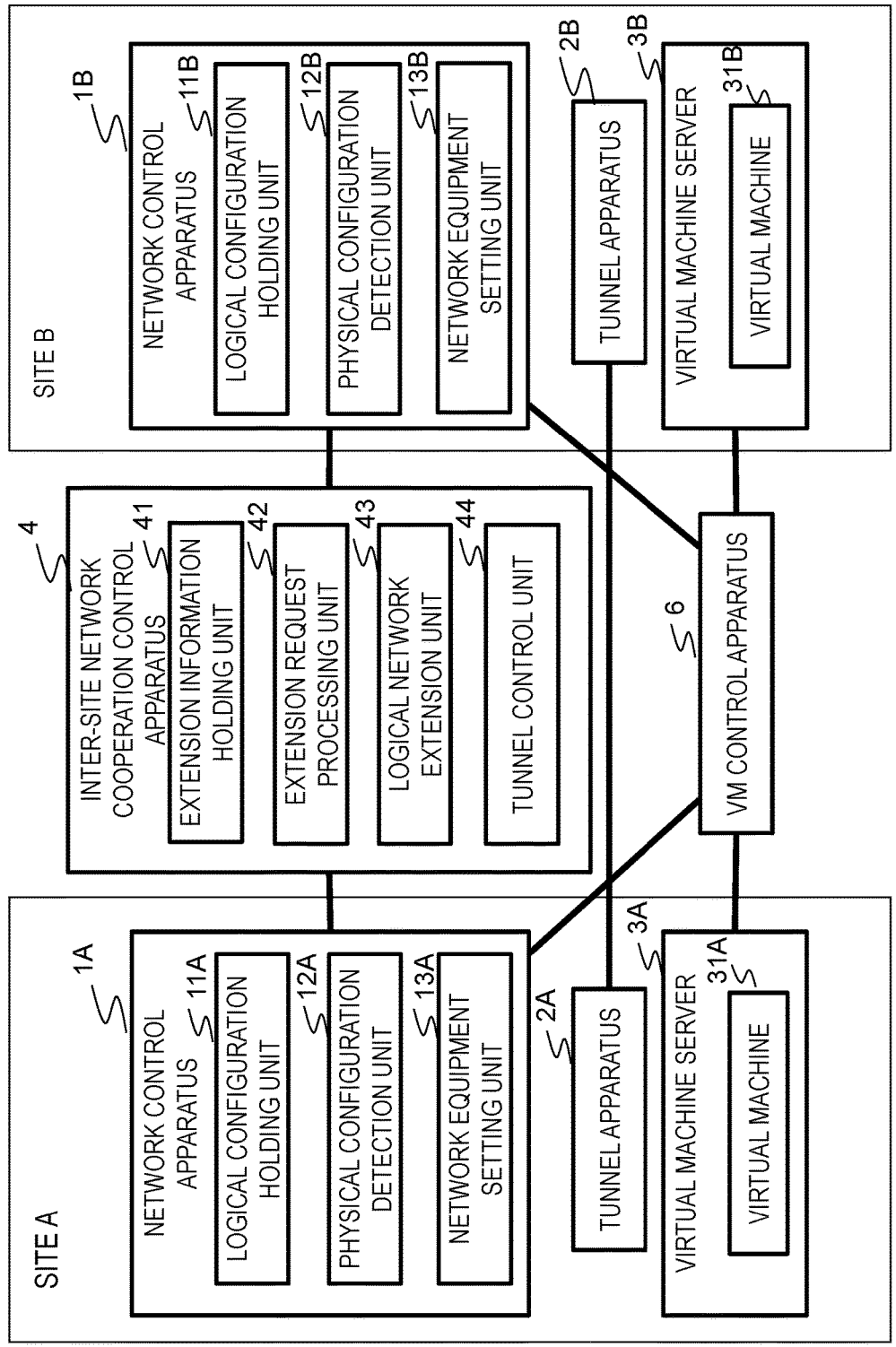
FIG. 3 is a diagram illustrating the configuration of a first exemplary embodiment of the present invention.

According to some preferred aspects, the inter-site network cooperation control apparatus (4) may be configured to comprise an extension request processing unit (42 in FIG. 3), a tunnel control unit (44 in FIG. 3), an extension information holding unit (41 in FIG. 3), and a logical network extension unit (43 in FIG. 3). The extension request processing unit (42 in FIG. 3) may be configured to extend a virtual network across sites or release an extension when receiving the extension request (FIG. 7B) from the network control apparatus (for instance 1A) or an extension release request (FIG. 7C) related to the extension of the virtual network extending across the sites.

The tunnel control unit (44 in FIG. 3) may be configured to create or delete a port connecting to the virtual network in each site and connecting a tunnel between the ports in the tunnel apparatus.

The extension information holding unit (41 in FIG. 3) may be configured to hold at least information of the virtual network extended to another site and of the virtual port extended to the another site.

The logical network extension unit (43 in FIG. 3) may be configured to instruct the network control apparatus in the extension destination site to create a virtual network, and create or delete a virtual port for a tunnel, and register or delete the information of the extended virtual network and virtual port in the extension information holding unit (41).

According to some preferred aspects, the network control apparatus (1A and 1B) may be configured to comprise a logical configuration holding unit (11A and 11B in FIG. 3), a configuration detection unit (physical configuration detection units 12A and 12B in FIG. 3), and a network equipment setting unit (13A and 13B in FIG. 3).

The logical configuration holding unit (11A and 11B in FIG. 3) holds at least information related to affiliation of the virtual network and the virtual port.

The configuration detection unit (the physical configuration detection units 12A and 12B in FIG. 3) may be configured to determine whether or not an operation related to the configuration of the network is a process within the site thereof by referring to the logical configuration holding unit (11A and 11B in FIG. 3), and notify the inter-site network cooperation control apparatus (4 in FIG. 3) of the extension request in a case of a process of extending a virtual network to another site.

The network equipment setting unit (13A and 13B in FIG. 3) may be configured to set up network equipment within a site.

According to some preferred aspects, when the configuration detection unit (the physical configuration detection units 12A and 12B in FIG. 3) detects the configuration information of a virtual port set up in another site or a port controlled in another site, the network control apparatus (1A and 1B in FIG. 3) notifies an extension request to the inter-site network cooperation control apparatus (4).

Upon receiving the extension request from the network control apparatus, the extension request processing unit (42 in FIG. 3) in the inter-site network cooperation control apparatus (4) identifies an extension destination site, and makes an inquiry to the extension information holding unit about whether a corresponding virtual network has been created in the network control apparatus in the extension destination site.

If the virtual network has not been created, the logical network extension unit (43 in FIG. 3) in the inter-site network cooperation control apparatus (4) instructs the network control apparatus in the extension destination site to create a virtual network and a virtual port for a tunnel for connecting the virtual network.

The inter-site network cooperation control apparatus (4) may be configured to request the network control apparatus in the extension destination to create a virtual port in the extension destination site corresponding to a virtual port in the extension source site included in the extension request, and associate port information of the virtual port in the extension source site with the virtual port created in the extension destination site after the virtual network has been extended.

Or according to another aspect, there may be provided a network control agent (32A and 32B in FIG. 8) that acquires information of a virtual network and/or virtual port created in a site and notifies a corresponding network control apparatus thereof.

Or according to another aspect, the network control apparatus may be configured to comprise a logical configuration holding unit (11A and 11B in FIG. 10) that holds information related to affiliation of a virtual network and a virtual port. The network control agent (32A and 32B in FIG. 10) may be configured to notify the inter-site network cooperation control apparatus of configuration information related to another site and set up a network equipment(s) in a site.

According to one of exemplary embodiments, even when a virtual network extends across sites, it is possible to automatically configure a network in a site and a network between sites only with a logical operation for the network control apparatus in a single site (for instance an extension source site) and realize defined connectivity.

Further, in an extension across sites, limits imposed by a virtual network technology and ID space related to the network control apparatus in each site can be avoided. For instance, a limit that the virtual network technologies in two sites connected to provide the endpoints of a virtual network in the tunnel apparatus in each site must be the same can be avoided.

It is noted that in the present description, a virtual port denotes a port in a logical configuration of a virtualized network.

In the present description, a port designates a port connected to for instance a NIC (Network Interface Controller) of a virtual machine, i.e., a port of a virtual switch on a virtual machine server connected to a physical port of a physical switch or to a port of a physical switch by software.

According to an exemplary embodiment, even when virtual machines are provided in different sites, the sites can be connected as when the virtual machines are provided within a site. Therefore, a virtual machine control service can provide a virtual machine in a server of a different site. As a result, virtual machine creation requests from users of more cloud infrastructures (IaaS) can be addressed.

(Configuration)

Figure 1:
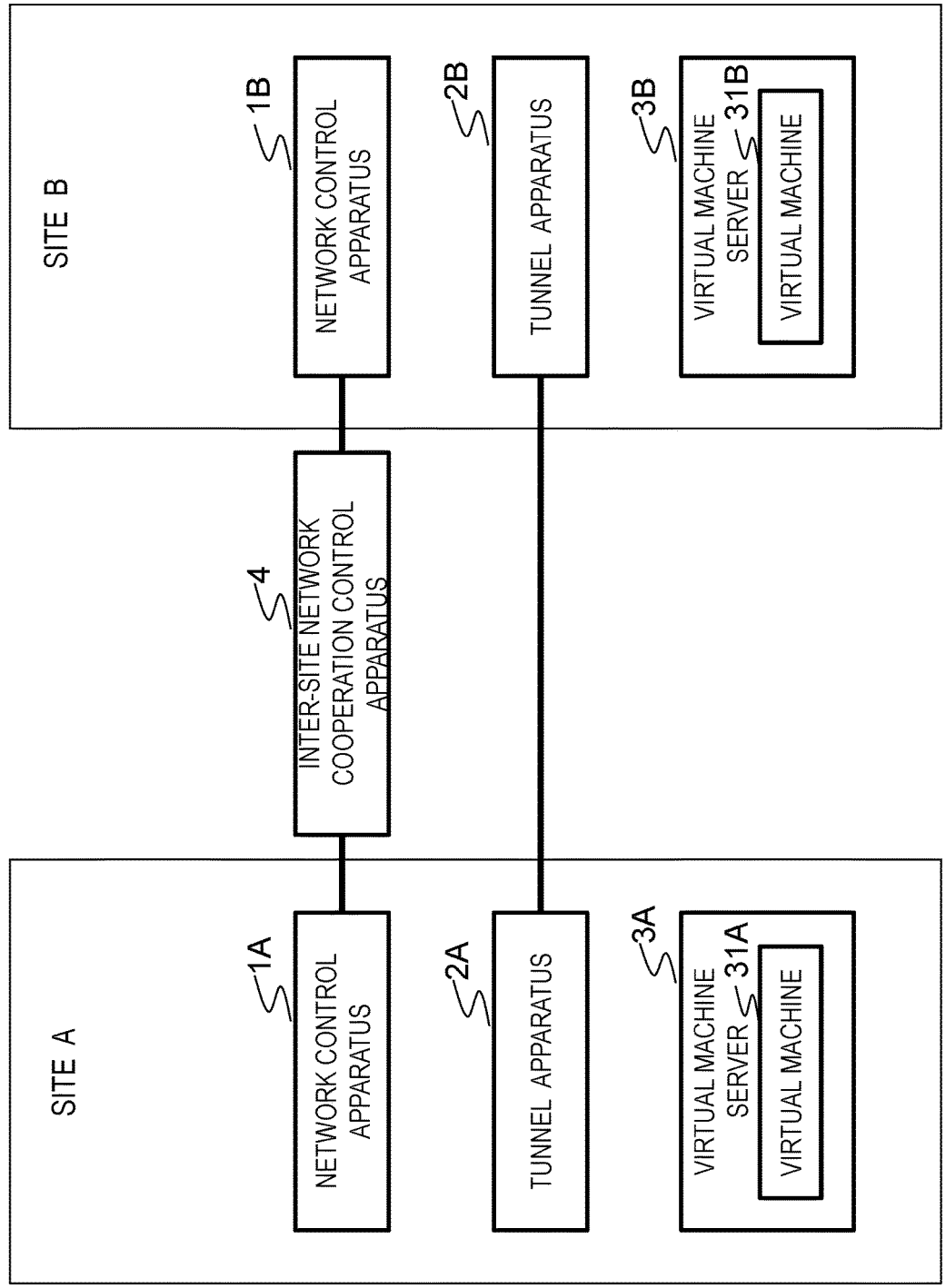
FIG. 1 is a diagram illustrating a configuration of an exemplary embodiment of the present invention.

In an exemplary embodiment of the present invention, as shown in FIG. 1, there are provided network control apparatuses 1A and 1B, tunnel apparatuses 2A and 2B, and virtual machine servers 3A and 3B on which virtual machines 31A and 31B operate, provided in the sites A and B, respectively, and the inter-site network cooperation control apparatus 4 provided outside the sites A and B. The apparatuses (the network control apparatus 1A, the tunnel apparatus 2A, and the virtual machine server 3A) in the site A are mutually connected, and so are the apparatuses (the network control apparatus 1B, the tunnel apparatus 2B, and the virtual machine server 3B) in the site B. Each of the network control apparatuses 1A and 1B in the sites A and B is connected to the inter-site network cooperation control apparatus 4. Each of the sites A and B is able to realize a virtual network service that automatically extends a virtual network across the other site B or A.

The present exemplary embodiment assumes that, as for a connection within a site, communication can be divided for each virtual network by means of a network virtualization technology after a network has been connected. As the network virtualization technology, for instance VLAN or OpenFlow may be used though not limited thereto. The network may be divided for each virtual network, for instance, using VLAN IDs (for instance port-based VLAN) though not limited thereto. In the present exemplary embodiment, different network virtualization technologies can be used for the sites A and B (it goes without saying that the sites A and B can use the same network virtualization technology).

Figure 2:
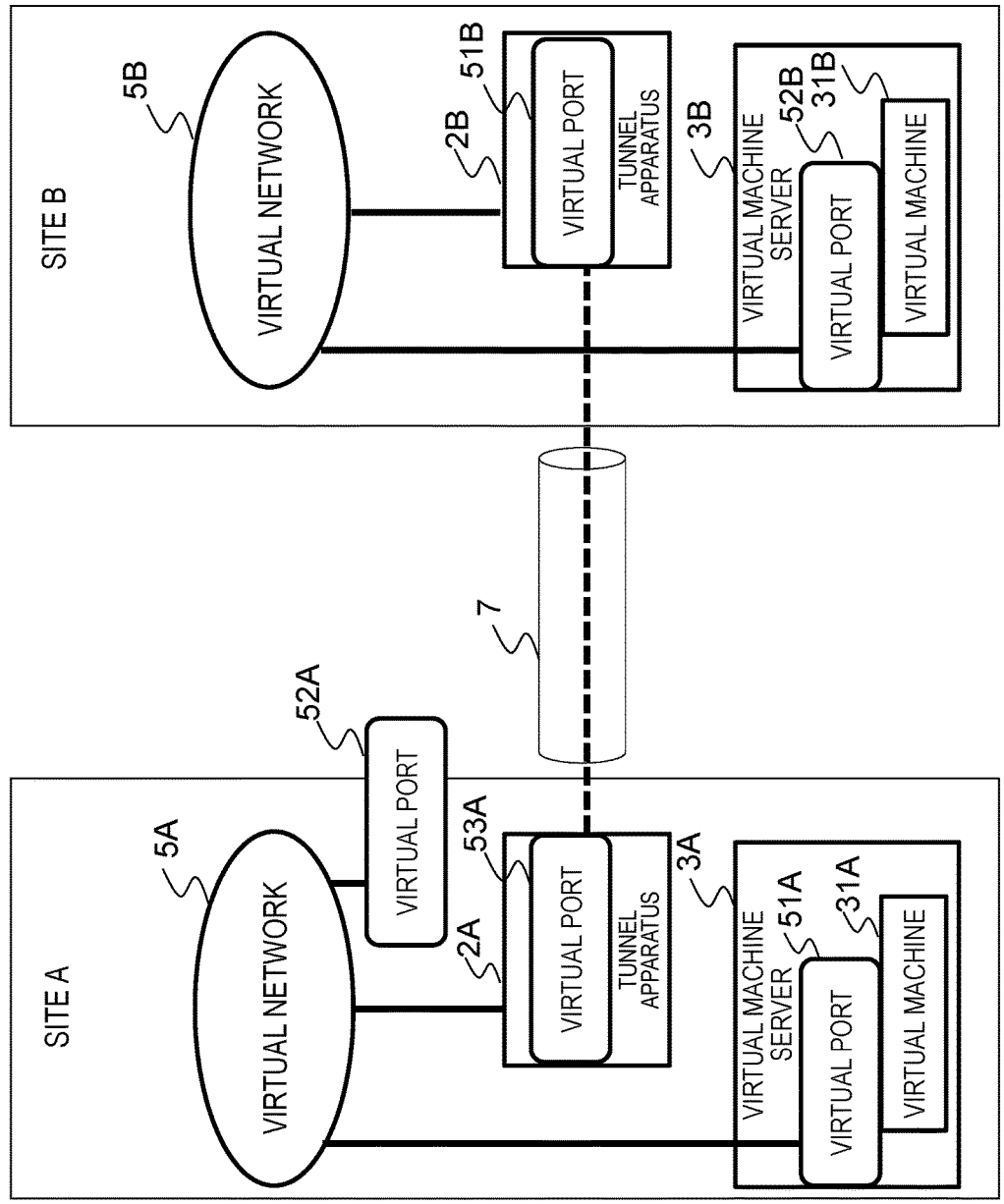
FIG. 2 is a diagram illustrating the logical configuration of virtual networks of an exemplary embodiment of the present invention.

The network control apparatus 1A/1B comprises:

means (corresponding to the logical configuration holding unit 11A/11B in FIG. 3) for holding affiliation of a virtual network (for instance 5A/5B in FIG. 2) and a virtual port (51A/52B, and 53A/51B in FIG. 2);

means (corresponding to the physical configuration detection unit 12A/12B in FIG. 3) for detecting network physical configuration information that comprises a function of notifying the inter-site network cooperation control apparatus 4 of information on another site B/A (configuration information, etc.); and means (corresponding to the network equipment setting unit 13A/13B in FIG. 3) for setting a network equipment (s) (not shown in the drawings) such as a switch(es) in the site A/B.

In the present exemplary embodiment, a virtual network (for instance 5A/5B in FIG. 2) and a virtual port (51A/52B, and 53A/51B in FIG. 2) receive the operation for configuring a network in both the sites A and B. Further, connectivity equivalent to that between virtual ports belonging to the same virtual network provided between the sites A and B.

The tunnel apparatus 2A/2B in the site A/B each is configured to be able to hold a plurality of ports simultaneously. Under the inter-site network cooperation control apparatus 4, the tunnel apparatus 2A/2B in the site A/B is connected to the other tunnel apparatus 2B/2A in the other site B/A.

In the present exemplary embodiment, a normal connection method related to a connection between a virtual machine and a virtual network is used to connect a virtual network within a site though not limited thereto. Further, a virtual machine is connected to a virtual network using, for instance, a virtual network adapter (not shown in the drawings) on the virtual machine server (3A/3B).

In tunneling, communication is performed by encapsulating a packet written in a specific protocol in a packet of another protocol. The tunnel apparatuses on both ends perform encapsulation and decapsulation of a packet. For instance, in an inter-site VPN connecting VPN devices between the sites, the tunnel apparatuses 2A and 2B are provided on both ends of the VPN tunnel and are configured as VPN devices (gateway) that perform tunneling, encryption, decryption, etc. For instance, as the VPN device, a router supporting the layer-3 (network layer) tunneling protocol IPSec (Security Architecture for Internet Protocol) may be used. Note that the present invention does not particularly limit the tunneling protocol used. As a VPN tunneling protocol, layer-2 (data link layer) PPTP (Point to Point Tunneling Protocol), L2TP (Layer 2 Tunneling Protocol), or a combination of IPSec and L2TP may be used in addition to layer-3 IPSec. For instance, the VPN device may be configured to encapsulate an IP packet to which a fixed global IP (Internet Protocol) address is assigned and having a private IP address assigned to a host (for instance a virtual machine) in a site, give the global IP address to a new dedicated IP header for the tunnel mode, and encrypt the original IP header.

The virtual machine server 3A/3B is created by virtualizing hardware resources with a server virtualization technology, and the virtual machine 31A/31B runs on a virtual machine monitor such as a hypervisor or a virtualization layer. A configuration in which the virtual machines 31A/31B is created and started by a virtual machine control apparatus (VM control apparatus 6 in FIG. 3) on the virtual machine server 3A/3B is assumed though not limited thereto.

The virtual machine control apparatus (the VM control apparatus 6 in FIG. 3) creates virtual port (51A/52B in FIG. 2) on the virtual machine server 3A/3B. Mapping information associating information of a port connected to a network interface controller (Virtual Network Interface Controller) of the virtual machine 31A/31B created on the virtual machine server 3A/3B with a virtual port IP is notified to the network control apparatus 1A/1B or the virtual machine server 3A/3B.

Figure 12:
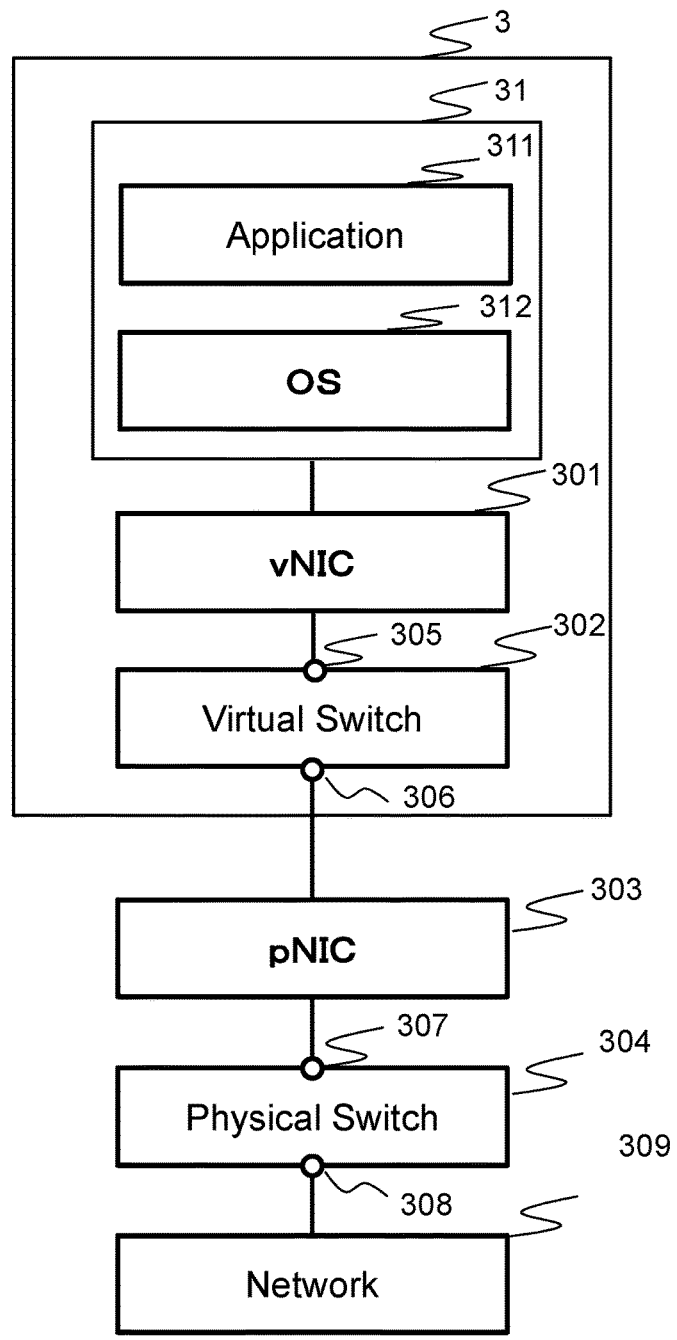
FIG. 12 is a diagram schematically illustrating a virtual machine, a virtual switch, NICs, and a physical switch.

For instance, as schematically shown in FIG. 12, a virtual machine 31 (an OS 312 and application 311) on a virtual machine server 3 is connected to a port 305 of a virtual switch 302 via a virtual network interface controller (vNIC) 301, to a physical port 307 of a physical switch 304 from a port 306 of the virtual switch 302 via a physical NIC (pNIC) 303, and to a network 309 (virtual network) via a port 308 of the physical switch 304. The virtual NIC 301 and the virtual switch 302 are virtualized physical switches on the virtual machine server 3 and, like the virtual machine 31, are provided by a virtual machine monitor (not shown in the drawing) on the virtual machine server 3. Further, a user may manually operate processing performed by the virtual machine control apparatus (the VM control apparatus 6 in FIG. 3).

The inter-site network cooperation control apparatus 4 comprises:

means (extension request processing unit 42 in FIG. 3) for processing an extension of a virtual network extending across sites on the basis of a notification received from the network control apparatus 1A/1B;

means (tunnel control unit 44 in FIG. 3) for controlling the tunnel apparatus 2A/2B to create and delete a tunnel for connecting virtual networks in each site A/B;

means (the logical network extension unit 43 in FIG. 3) for instructing the network control apparatus 1A/1B to create replica of a virtual network and a virtual port or a virtual port for a tunnel required for an extension; and means (the extension information holding unit 41 in FIG. 3) for holding information of an extended virtual network and a virtual port.

The inter-site network cooperation control apparatus 4 enables a physical port connected to another site to communicate with a virtual port belonging to a virtual network defined in the original site by extending a logical configuration on the basis of a notification from the network control apparatus 1A/1B and controlling to create a tunnel.

(Operation)

Next, the operation of the present exemplary embodiment will be described. An example of an extension of a virtual network from the site A to the site B will be described with reference to FIGS. 1 and 2.

First, based on a request from a user not shown in the drawings, the network control apparatus 1A (1A in FIG. 1) in the site A creates the virtual network 5A and the virtual port 51A for the virtual machine 31A on the virtual machine server 3A.

The network control apparatus (1A in FIG. 1) detects that a port of the virtual machine 31A has been connected as the virtual port 51A, and sets up network equipments constituting the virtual network 5A so that the virtual port 51A can only be connected to a port belonging to the virtual network 5A. At this point, however, since no other ports exist, the virtual port 51A cannot be connected to any port.

Then, based on a request from the user, the network control apparatus (1A in FIG. 1) creates the virtual port 52A belonging to the virtual network 5A provided by the network control apparatus 1A. Note that the virtual port 52A may be a port of a network equipment (for instance an OpenFlow switch) constituting the virtual network 5A, as a predetermined port in the logical configuration of the virtual network 5A provided by the network control apparatus 1A.

The network controller 1A (FIG. 1) detects that a port of the virtual machine 31A, as the virtual port 51A, has been connected and notifies the inter-site network cooperation control apparatus (4 in FIG. 1).

The inter-site network cooperation control apparatus (4 in FIG. 1) extends the virtual network 5A to the site B. More specifically, the network control apparatus 1B in the site B creates and sets up the virtual network 5B and the virtual port 51B (53A) as a tunnel port (port for a tunnel) so that the tunnel apparatuses 2A and 2B can communicate with each other.

The inter-site network cooperation control apparatus (4 in FIG. 1) instructs the network control apparatus 1B to create the virtual port 52B that corresponds to the virtual port 51A.

The network control apparatus (1B in FIG. 1) detects that a port of the virtual machine 31B, as the virtual port 52B, has been connected. The network control apparatus (1B in FIG. 1) sets up a network equipment (s) (not shown in the drawings) constituting the virtual network 5B so that the virtual port 52B can only be connected to a port belonging to the virtual network 5B. As a result, the virtual machines 31A and 31B are able to communicate with each other via the virtual port 51A, the virtual network 5A, the virtual port 53A, the tunnel apparatus 2A, the tunnel apparatus 2B, the virtual port 51B, the virtual network 5B, and the virtual port 52B.

(Effects)

In the present exemplary embodiment, according to the configuration and operation described above, even when a virtual network extends across sites, a network in each site and a network between the sites can be automatically configured and defined connectivity can be realized with just a logical operation on the network control apparatus in the extension source (the simplification and labor-saving of the operation). Therefore, for instance, the present invention is suitably applied to an extension of a virtual network in a site provided by a cloud infrastructure which provides network resources as virtual resources, to another site, though not limited thereto.

In the present exemplary embodiments, operation sequences differ, depending on where mapping between a virtual port (for instance, a virtual port of a virtual switch) and a port (for instance, a port of a physical switch and forth) is obtained, and on what configures a network using this mapping information.

First, a first exemplary embodiment describes a case where mapping, as ancillary information of a virtual port, is handed over from the VM control apparatus (6 in FIG. 3) to the network control apparatus (1A/1B in FIG. 1), and is set in an OpenFlow controller that performs centralized control over a network.

In a second exemplary embodiment described later, a case where mapping, as added information of a physical port, is registered from a user in a virtual machine server and the network control apparatus collects the information using an agent and sets the information in an OpenFlow controller will be described.

Further, in a third exemplary embodiment described later, a case where the agent collects the mapping information and sets up a virtual network using VLAN will be described. The following describes these exemplary embodiments.

Exemplary Embodiment 1

Configuration

The first exemplary embodiment of the present invention will be described in detail with reference to the drawings. FIG. 3 is a diagram showing the configuration of the first exemplary embodiment of the present invention. Referring to FIG. 3, there are provided network control apparatuses 1A and 1B, tunnel apparatuses 2A and 2B, and virtual machine servers 3A and 3B. Also provided an inter-site network cooperation control apparatus 4 and a virtual machine control apparatus (VM control apparatus) 6 both arranged outside the sites A and B. Between the sites, each of the network control apparatuses 1A and 1B is connected to the inter-site network cooperation control apparatus 4, and the tunnel apparatuses 2A and 2B are connected. It is noted that each of the virtual machine servers 3A and 3B has a single virtual machine, 31A and 31B, respectively, in the drawing simply for the sake of simplifying the drawing, but there may be a plurality of them. Further, each site may comprise a plurality of the virtual machine servers 3A and 3B, which may be connected to each other via the common tunnel apparatuses 2A and 2B. The same may be said of the other exemplary embodiments as well.

The network control apparatus 1A/1B comprises the logical configuration holding unit 11A/11B, the physical configuration detection unit 12A/12B, and the network equipment setting unit 13A/13B. It is noted that the processing and the functions of some or all of the logical configuration holding unit 11A/11B, the physical configuration detection units 12A/12B, and the network equipment setting unit 13A/13B in the network control apparatus 1A/1B may be realized by a program operating on a computer.

The inter-site network cooperation control apparatus 4 comprises the extension information holding unit 41, the extension request processing unit 42, the logical network extension unit 43, and the tunnel control unit 44. Further, the processing and the functions of some or all of the extension information holding unit 41, the extension request processing unit 42, the logical network extension unit 43, and the tunnel control unit 44 in the inter-site network cooperation control apparatus 4 may be realized by a program operating on a computer.

(Data Structure)

The logical configuration holding unit 11A/11B in the network control apparatus 1A/1B comprises a storage device (not shown in the drawings) capable of writing/reading data and stores Virtual network;

Virtual port; and

Information on affiliation relation between the virtual network and the virtual port.

FIG. 4A is a diagram illustrating an example of the virtual network information held in the logical configuration holding unit 11A in the site A. In FIG. 4A, the virtual network information held in the logical configuration holding unit 11A includes a virtual network ID and a name.

FIG. 4B is a diagram illustrating an example of the virtual port information held in the logical configuration holding unit 11A. In FIG. 4B, the virtual port information includes:

Virtual port ID;

Name; and

ID information of a virtual network to which the virtual port belongs.

It is noted that the name columns in the virtual network information and the virtual port information do not necessarily have to be provided (do not have to be provided).

The logical configuration holding unit 11A/11B in the network control apparatus 1A/1B holds port information required for the configuration of network equipment as information accompanying a virtual port.

FIG. 4C is a diagram showing an example of port information of the site A. In FIG. 4C, the port information includes:

Virtual port ID;

Switch identification information (DPID: Data Path ID); and

Port number in the switch.

The extension information holding unit 41 of the inter-site network cooperation control apparatus 4 holds:

Virtual network extending into another site;

Information of a virtual port extending into another site; and

Information of a virtual port for a tunnel.

FIG. 6A is a diagram showing an example of the information of a virtual network extending into the site B. FIG. 6B is a diagram showing an example of the information of a virtual port extending into the site B. FIG. 6C is a diagram showing an example of the information of virtual ports for a tunnel.

Referring to FIG. 6A, the information of a virtual network extending into the site B includes:
Extension ID (A1B1);
Extension source ID (A in this example);
Extension source virtual network ID (0x1);
Extension destination site ID (B); and
Extension destination virtual network ID (0x1).
Note: "0x" in "0x1" denotes hexadecimal notation.

Referring to FIG. 6B, the information of a virtual port extending into the site B includes:
Extension ID (A1B1);
Extension source site ID (A);
Extension source virtual port ID (0x2: the virtual port 52A in FIG. 2);
Extension destination site ID (B); and
Extension destination virtual port ID (0x2: the virtual port 52B in FIG. 2)
as a set.

Referring to FIG. 6C, the information of virtual ports for a tunnel includes:
Extension ID;
Site ID; and
ID of a virtual port for a tunnel
as the information of a virtual port created as a tunnel port (port for a tunnel).

The information of virtual ports for a tunnel includes:
regarding the site A,
Extension ID (A1B1);
Site ID (site A); and
ID of a virtual port for a tunnel (0x3: the virtual port 53A in FIG. 2), and
includes:
regarding the site B,
Extension ID (A1B1);
Site ID (site B); and
ID of a virtual port for a tunnel (0x1: the virtual port 51B in FIG. 2).

It is noted that the extension ID in the information of an extended virtual network is used as the extension ID written in the information of an extended virtual port and of a virtual port for a tunnel.

Further, the extension information holding unit 41 of the inter-site network cooperation control apparatus 4 comprises a storage device (not shown in the drawings) capable of writing/reading data and stores
Information of the network control apparatuses 1A and 1B in the sites A and B; and
Information of the sites.

FIG. 7A is a diagram showing an example of the information held in the extension information holding unit 41 of the inter-site network cooperation control apparatus 4. Referring to FIG. 7A, the extension information holding unit 41 holds a set of a network control apparatus identifier and a site ID (A/B). In the example shown in FIG. 7A, the IP address of the network control apparatus is used as the network control apparatus identifier. This information is set by the administrator of the inter-site network cooperation control apparatus. Further, an IPv4 (Internet Protocol version 4 (32 bits)) IP address is used, but it may be an IPv6 (Internet Protocol version 6), etc.

(Operation 1-1: Connection in a Site)
The following describes network connection setup in a site, which is a basic operation in each site performed during an inter-site network extension operation in the first exemplary embodiment. It is noted that though not limited thereto, existing technologies can be used in this operation, and an operation unique to the first exemplary embodiment is added to parts regarding decisions inside/outside the site.
(Process 1-1-1)
First, based on a request from a user (not shown in the drawings), the network control apparatus 1A (FIG. 1) in the site A creates the virtual network 5A and the virtual port 51A (FIG. 2), and registers the information of the created virtual network 5A and virtual port 51A in the logical configuration holding unit 11A of the network control apparatus 1A (FIG. 1). The registered values become the entries for the virtual network (ID: 0x1) in FIG. 4A and the virtual port (virtual port ID: 0x1; name: Port 51A; virtual network ID: 1) in FIG. 4B, respectively.
(Process 1-1-2)
Next, the user (not shown in the drawings) requests the virtual machine control apparatus (the VM control apparatus 6 in FIG. 3) to create the virtual machine 31A (31A in FIGS. 1, 2, and 3) in the site A. At this time, the virtual port 51A (ID: 0x1) may be designated as the NIC (vNIC) of the virtual machine 31A.
(Process 1-1-3)
The virtual machine control apparatus (the VM control apparatus 6 in FIG. 3) collects identification information (switch identification information DPID in FIG. 4C) on a connection destination switch (not shown in FIGS. 1 to 3) and a port number of this switch (not shown in the drawings) as information of a port connected to the NIC (not shown in the drawings) of the virtual machine 31A (FIG. 3).
(Process 1-1-4)
The virtual machine control apparatus (the VM control apparatus 6 in FIG. 3) notifies the network control apparatus 1A of the identification information of the switch (not shown in the drawings) and the port number of the switch (not shown in the drawings) as the port information of the virtual port (the virtual port 51A in FIG. 3, ID=0x1) (refer to FIG. 4C).

As shown in FIG. 4C, the port information of the virtual port (the virtual port 51A in FIG. 3, ID=0x1) will be as follows.
Switch identification information: 0xa001 (16 bits)
Port number: 1
Further, in a case where the virtual network technology used in each site is different from each other, a process of exchanging information used in these virtual network technologies, or registering information in the virtual machine servers (such as 3A in FIG. 3) as described in the second and the third exemplary embodiments below is required.
(Process 1-1-5)
The network control apparatus 1A (FIG. 3) has the physical configuration detection unit 12A (FIG. 3) process the notification from the virtual machine control apparatus 6 (FIG. 3). The physical configuration detection unit 12A determines whether or not the port in question is in its own site from the port information notified by the virtual machine control apparatus 6 (FIG. 3). Several methods can be used for this judgment.
For instance,
(I) With a site ID (for instance A or B) inserted into the switch identification information (DPID), the physical configuration detection unit 12A of the network control apparatus 1A in the site A compares the site ID inserted into the switch identification information (DPID) with the ID of its own site. Or
(II) The virtual machine server 3A has an identifier of the network control apparatus 1A, under which the virtual machine server 3A is controlled, set therein, the identifier of the network control apparatus 1A is added to the notification information from the virtual machine control apparatus 6 (FIG. 3), and the physical configuration detection unit 12A compares it with the identifier of its own (the network control apparatus 1A).

The example below assumes that the location of a port in question is determined using the (I) method, though not limited thereto.

(Process 1-1-6)

As a result of the judgment, the physical configuration detection unit 12A of the network control apparatus 1A (FIG. 3) determines that the port is in its own site (the site A), and the processing moves to the network equipment setting unit 13A from the physical configuration detection unit 12A in the network control apparatus 1A.

(Process 1-1-7)

The network equipment setting unit 13A sets up a network equipment(s) (not shown in the drawings) so that the port can only be connected to a port belonging to the same virtual network 5A. The method for the setup depends on a network virtualization technology used in the site. Further, there may be a case wherein each network equipment may be set up, or a case wherein a network controller configured to perform centralized control of a network may be provided and network controller is set up. In the present exemplary embodiment, it is assumed that a network virtualization technology using OpenFlow is utilized, though not limited thereto. The setup is made to an OpenFlow controller configured to perform centralized control of OpenFlow switches (network equipments) constituting network nodes in the site. Further, the functions of an OpenFlow controller may be implemented in the network control apparatuses 1A and 1B.

(Operation 1-2: Extension)

The following describes an example of an operation of extending the virtual network from the site A to the site B in detail with reference to FIG. 2 to FIG. 7B.

(Process 1-2-1)

A user creates the virtual port 52A (refer to FIG. 2) belonging to the virtual network 5A (FIG. 2) for the network control apparatus 1A so as to connect the virtual machine 31B (refer to FIG. 3) provided in the site B. At this point, as described above, an entry (ID of the virtual port: 0x2; name: Port 52A; virtual network ID: 0x1 in FIG. 4B) for the virtual port (ID: 0x2) is created in the logical configuration holding unit 11A of the network control apparatus 1A (FIG. 3).

(Process 1-2-2)

Next, the user requests the virtual machine control apparatus (the VM control apparatus 6 in FIG. 3) to create the virtual machine 31A (FIG. 3). At this time, the user designates the virtual port 51A (FIG. 2) as the NIC of the virtual machine 31A (FIGS. 2 and 3) to the virtual machine control apparatus (the VM control apparatus 6 in FIG. 3).

(Process 1-2-3)

The virtual machine control apparatus 6 (FIG. 3) that creates the virtual machine 31B (FIGS. 2 and 3) collects the identification information of the connection destination switch (switch identification information) and the port information of the switch (for instance physical port information) as port information corresponding to the virtual machine 31B (FIGS. 2 and 3), during the virtual machine creation process, and notifies the network control apparatus 1A (FIG. 3) of the collected information. For instance, as shown in FIG. 5C, the port information (the site B) corresponding to the virtual port 52A (FIG. 2) has following information items:

Virtual port ID: 0x2
Switch identification information: 0xb002
Port number: 2.

The switch identifier above corresponds to an identifier of the physical switch 304 in FIG. 12, for instance, and the port number corresponds to a port number given to the port 308 of the physical switch 304 to which the virtual machine 31 in FIG. 12 is connected via the NIC 303, though not limited thereto.

(Process 1-2-4)

In the network control apparatus 1A (FIG. 3), the physical configuration detection unit 12A determines whether or not the port in question is included in its own site (the site A) from the port information notified by the virtual machine control apparatus (the VM control apparatus 6 in FIG. 3). As a result of the judgment, since the port is not included in its own site, an extension request is notified to the inter-site network cooperation control apparatus (4 in FIGS. 1 and 3). For instance, as shown in FIG. 7B, the notification content includes information items as follows.

Identifier of the extension source network control apparatus 1A: 10.10.0.2
Extension source virtual network ID: 0x1
Extension source virtual port ID: 0x2
Port information (Switch identifier): 0xb002
Port information (Port number): 2

It is noted that, in a case of (II) described above, port information (an identifier of the network control apparatus 1B) is added.

(Process 1-2-5)

The extension request processing unit 42 (FIG. 3) of the inter-site network cooperation control apparatus 4 receives the extension request and identifies the extension destination site (ID: B).

In the case of (I) described above, the extension destination site ID is obtained from the switch identifier.

In the case of (II) described above, the extension destination site ID is obtained from the port information (network control apparatus identifier), and the network control apparatus (network control apparatus identifier) and the site information (site ID) shown in FIG. 7A.

(Process 1-2-6)

Next, in the inter-site network cooperation control apparatus 4, the extension request processing unit 42 (FIG. 3) asks the extension information holding unit 41 whether or not the virtual network has been extended into the destination site.

More specifically, the extension information holding unit 41, with reference to the virtual network extension information shown in FIG. 6A, retrieves whether or not an entry having a set of the extension source site, the extension destination site, the extension source virtual network, and the extension destination virtual network exists.

(Process 1-2-7)

As a result of the retrieval in the virtual network extension information by the extension information holding unit 41, when no virtual network extension is registered (the virtual network is not extended), the logical network extension unit 43 (FIG. 3) in the inter-site network cooperation control apparatus 4 performs extension of the virtual network into the site B.

Then, using the extension destination network ID obtained as a result of this process, the logical network extension unit 43 performs the following process (Process 1-2-8).

Meanwhile, as a result of the search in the virtual network extension information by the extension information holding unit 41, when the virtual network has already been extended, the following process is performed on the basis of the extension destination virtual network ID of the entry (for instance, moving to (Process 1-2-16) below).
(Process 1-2-8)

When the virtual network has not been extended, the logical network extension unit 43 (FIG. 3) in the inter-site network cooperation control apparatus 4 requests the network control apparatus 1B in the site B to create a virtual network.
(Process 1-2-9)

The network control apparatus 1B creates a virtual network (ID: 0x1; name: Network 1 (Net A: 0x1)) shown in FIG. 5A, and returns ID of the created virtual network to the logical network extension unit 43 (FIG. 3) of the inter-site network cooperation control apparatus 4. The logical network extension unit 43 treats the ID of the virtual network created by the network control apparatus 1B as an extension destination virtual network ID, and registers the virtual network extension information shown in FIG. 6A (an entry of the extension ID, the extension source site ID, the extension source virtual network ID, the extension destination site ID, and the extension destination virtual network ID) in the extension information holding unit 41.
(Process 1-2-10)

Next, the logical network extension unit 43 of the inter-site network cooperation control apparatus 4 requests the network control apparatuses 1A and 1B to create virtual ports for a tunnel in order to connect the virtual networks 5A and 5B using the tunnel.
(Process 1-2-11)

In response to the request (instruction) to create virtual ports for a tunnel from the logical network extension unit 43 of the inter-site network cooperation control apparatus 4, the network control apparatuses 1A and 1B create respectively:
 a virtual port having a virtual port ID: 0x3 in the virtual port information (site A) as shown in FIG. 4B; and
 a virtual port having a virtual port ID: 0x1 in the virtual port information (site B) as shown in FIG. 5B.
(Process 1-2-12)

The logical network extension unit 43 of the inter-site network cooperation control apparatus 4 registers the information of the virtual ports created by the network control apparatuses 1A and 1B in the information of virtual ports for a tunnel (FIG. 6C) held in the extension information holding unit 41. In FIG. 6C, the information of virtual ports for a tunnel has:
 Extension ID;
 Site ID; and
 ID of a virtual port for a tunnel
as an entry.
(Process 1-2-13)

Then, the tunnel control unit 44 (FIG. 3) of the inter-site network cooperation control apparatus 4 creates a port connected to each of the virtual networks 5A and 5B (for instance, a physical port of such a router (switch) constituting the tunnel apparatuses 2A and 2B or a virtual port in a case where a router is virtualized on the server) in the tunnel apparatuses 2A and 2B in the sites A and B, and a tunneling connection between these ports is provided.

As a result, a communication connection is established between the virtual networks 5A and 5B in FIG. 2 via the virtual ports 53A and 51B for the tunnel and the tunnel 7.
(Process 1-2-14)

The information of the ports created in the tunnel apparatuses 2A and 2B in the sites A and B is notified by the tunnel apparatuses 2A and 2B or the tunnel control unit 44 of the inter-site network cooperation control apparatus 4 to the network control apparatuses 1A and 1B in the sites A and B, as in the case with the virtual machine.

The content of the notification to the network control apparatuses 1A and 1B is as follows.
 Information of an entry (Switch identification information and the Port number) of the Virtual port ID: 0x3 in the port information (site A) in FIG. 4C
 Information of an entry (Switch identification information and the Port number) of the Virtual port ID: 0x1 in the port information (site C) in FIG. 5C
(Process 1-2-15)

The network control apparatuses 1A and 1B perform the process above (Process 1-1-7 of setting up a network equipment(s) not shown in the drawings so that each of the ports can be connected to ports belonging to the same virtual network).

As a result, ports belonging to the same virtual network 5A or 5B in the site A or B can be connected to each other. By means of the processes so far, the virtual network has been extended across the sites A and B (an extension from the site A to the site B: the virtual network 5A is the extension source virtual network, and the virtual network 5B is the extension destination virtual network).
(Process 1-2-16)

The inter-site network cooperation control apparatus 4 performs a process of extending a virtual port after having performed the virtual network extension process.

First, the inter-site network cooperation control apparatus 4 requests the network control apparatus 1B to create a virtual port in the site B that corresponds to the virtual port in the site A included in the extension request. At this time, the virtual port in the site B belongs to the extension destination virtual network 5B. For instance, the logical configuration holding unit 11B of the network control apparatus 1B creates and holds the information of the virtual port having the virtual port ID of 0x2 in the virtual port information shown in FIG. 5B, and returns the created virtual port ID to the inter-site network cooperation control apparatus 4.

Having received this response, the inter-site network cooperation control apparatus 4 holds the virtual port extension information shown in FIG. 6B in the extension information holding unit 41(
 Extension ID: A1B1;
 Extension source site ID: A;
 Extension source virtual network ID: 0x2;
 Extension destination site ID: B; and
 Extension destination virtual network ID: 0x2).
(Process 1-2-17)

Then, the extension request processing unit 42 of the inter-site network cooperation control apparatus 4 associates the port information included in the extension request with the port information of the extension destination virtual port, i.e., the port information (ID=0x2) shown in FIG. 5B, and notifies the physical configuration detection unit 12B in the network control apparatus 1B of the port information. The physical configuration detection unit 12B and the network equipment setting unit 13A perform the process above (Process 1-1-7 of setting up the network equipment not shown in the drawings).
(Process 1-2-18)

As a result, the extension request process is complete, and for instance, in FIG. 2, the virtual machine 31A in the site A and the virtual machine 31B in the site B are able to communicate with each other via the virtual port 51A, the virtual network 5A, the virtual port 53A of the tunnel apparatus 2A, the virtual port 51B of the tunnel apparatus 2B in the site B, the virtual network 5B, and the virtual port 52B.

(Operation 1-3: Extension Release)

Next, a process of releasing a virtual network extension when the virtual machine 31B (refer to FIGS. 2 and 3) is deleted will be described.

(Process 1-3-1)

When the virtual machine B and the port thereof are deleted, the VM control apparatus 6 in FIG. 3 sends a notification to delete the port information of the virtual machine 31B to the network control apparatus 1A. Since the port information of the virtual port ID of 0x2 cannot be found in the virtual port extension information shown in FIG. 6B, the network control apparatus 1A determines that this pertains a site other than its own and sends the extension release request shown in FIG. 7C to the inter-site network cooperation control apparatus 4.

The extension release request includes:

Extension source network control apparatus identifier;

Extension source virtual network ID; and

Extension source virtual port ID.

(Process 1-3-2)

In the inter-site network cooperation control apparatus 4, the extension request processing unit 42 receives the extension release (FIG. 7C), refers to the extension information holding unit 41, acquires the extension source site ID from the network control apparatus and the site information, and further acquires the extension destination site ID and the extension destination virtual port ID from the virtual port extension information in FIG. 6B. On the basis of these items of information, the extension request processing unit 42 outputs a notification to delete the port information of the extension destination virtual port to the network control apparatus 1B.

(Process 1-3-3)

From this virtual port ID, the physical configuration detection unit 12B (FIG. 3) of the network control apparatus 1B in the site B acquires the port information (the entry of the virtual port ID: 0x2 in FIG. 5C) stored in the logical configuration holding unit 11B, and releases the connection settings for the network equipment in the network equipment setting unit 13B. The port information (the entry of the virtual port ID: 0x2 in FIG. 5C) stored in the logical configuration holding unit 11B is deleted.

(Process 1-3-4)

Next, the logical network extension unit 43 (FIG. 3) of the inter-site network cooperation control apparatus 4 sends a request to the network control apparatus 1B to delete the virtual port (ID=0x2) extended into the site B. In the network control apparatus 1B, the entry of the virtual port (virtual port ID: 0x2) is deleted from the logical configuration holding unit 11B.

(Process 1-3-5)

Then, the extension request processing unit 42 (FIG. 3) of the inter-site network cooperation control apparatus 4 determines that no virtual port is extended from the virtual network 5A (ID: 0x1) in the site A to the virtual network 5B (ID: 0x1) in the site B, and releases the virtual network extension. More specifically, this can be determined by checking whether or not there is an entry having the extension ID of A1B1 in the virtual port extension information (FIG. 6B) held in the extension information holding unit 41.

(Process 1-3-6)

First, the tunnel control unit 44 of the inter-site network cooperation control apparatus 4 releases the tunnel connection and deletes the virtual ports for the tunnel (53A and 51B in FIG. 2).

(Process 1-3-7)

Further, the tunnel control unit 44 acquires the virtual port ID for the tunnel in each site from the information of virtual ports for a tunnel (FIG. 6C) held in the extension information holding unit 41, and outputs a notification to delete the information of virtual ports for a tunnel to the network control apparatuses 1A and 1B.

(Process 1-3-8)

The network control apparatuses 1A and 1B perform the process described before (16 in (Process 1-2: Extension)) on the ID of the virtual port for a tunnel port in each site (the process of registering the virtual port information in the logical configuration holding units 11A and 11B and of returning the virtual port IDs thereto).

(Process 1-3-9)

Next, the logical network extension unit 43 (FIG. 3) of the inter-site network cooperation control apparatus 4 outputs a request to delete the virtual ports for the tunnel ports to the network control apparatuses 1A and 1B. The entry of the virtual port (virtual port ID: 0x2) is deleted from the logical configuration holding units 11A and 11B for each virtual port ID as in 4) described above.

(Process 1-3-10)

Then, the inter-site network cooperation control apparatus 4 deletes the information of virtual ports for a tunnel shown in FIG. 6C and the virtual network extension information shown in FIG. 6A from the extension information holding unit 41.

(Process 1-3-11)

The virtual machine control apparatus 6 (FIG. 3) sends a request to delete the virtual port to the network control apparatus 1A. The entry (the virtual port information) of the virtual port ID: 0x2 is deleted from the virtual port information (site) in FIG. 4B in the logical configuration holding unit 11A of the network control apparatus 1A.

(Effects)

As described, according to the first exemplary embodiment, even when a virtual network extends across sites, it is possible to automatically configure a network in each site and a network between sites only with a logical operation performed for the extension source network control apparatus (for instance, 1A) and realize the defined connectivity.

Further, according to the first exemplary embodiment, the virtual network and the virtual ports in the extension destination are newly defined by the inter-site network cooperation control apparatus 4 that holds their associations. As a result, the virtual network technology and ID space can be divided for each site. Therefore, it is unnecessary to greatly change the existing configuration of the network control apparatus 1A/1B.

Exemplary Embodiment 2

Next, the second exemplary embodiment of the present invention will be described. In the second exemplary embodiment, a user registers the mapping of virtual ports and ports in a virtual machine server as added information of physical ports, and the information is collected by the network control apparatus using the agent. Therefore, when the virtual machines are provided across sites, the site that receives the port information is different from the first exemplary embodiment. For instance, the port information received by the site A in the first exemplary embodiment is received by the site B in the second exemplary embodiment.
(Configuration)

Figure 8:
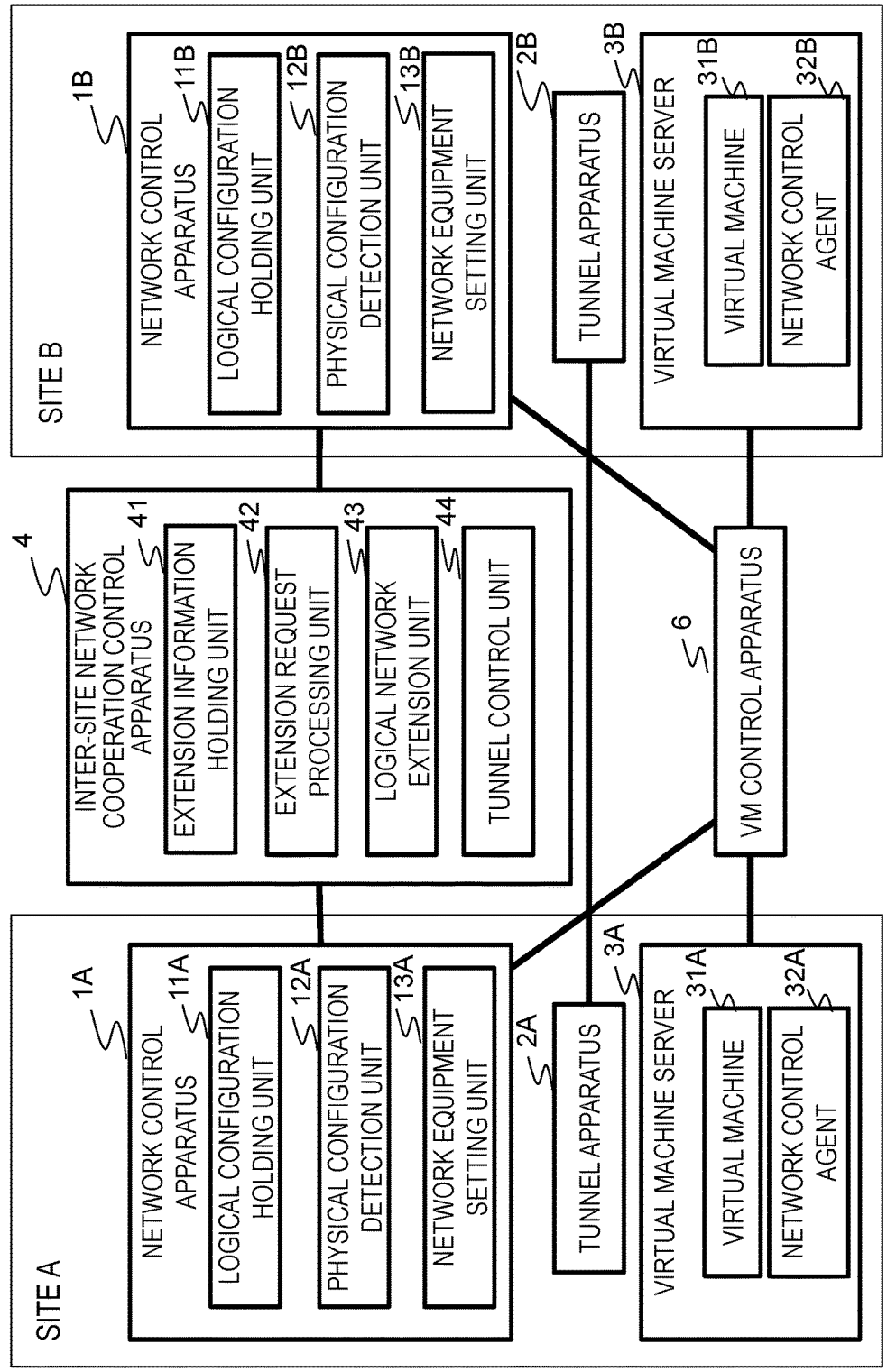
FIG. 8 is a diagram illustrating the configuration of a second exemplary embodiment of the present invention.

FIG. 8 is a diagram illustrating the configuration of the second exemplary embodiment. In FIG. 8, the configuration of the second exemplary embodiment adds the network control agents 32A and 32B operating on the virtual machine servers 3A and 3B to the configuration of the first exemplary embodiment shown in FIG. 3. Further, the virtual machines 31A and 31B hold the mapping of virtual ports and ports.
(Data Structure)

The data structure in the second exemplary embodiment is the same as that of the first exemplary embodiment shown in FIGS. 4A to 7C. Therefore, explanation will be omitted.
(Operation 2-1: Connection within a Site)

The following describes an example of the operation of the second exemplary embodiment will be described in detail with reference to FIGS. 8, 2, and 4A to 7C, using an extension of a virtual network from the site A to the site B, as an example.
(Process 2-1-1)

First, based on a request from a user, the network control apparatus 1A (FIG. 8) in the site A creates the virtual network 5A and the virtual port 51A (FIG. 2), and registers the information of the created virtual network 5A and virtual port 51A in the logical configuration holding unit 11A of the network control apparatus 1A. The registered values become the entries for the virtual network (ID: 0x1) in FIG. 4A and the virtual port (virtual port ID: 0x1; name: Port 51A; virtual network ID: 1) in FIG. 4B, respectively.

Next, the user (not shown in the drawings) requests the virtual machine control apparatus 6 (the VM control apparatus) to create the virtual machine 31A in the site A. At this time, the virtual port 51A (ID: 0x1) is designated as the NIC of the virtual machine 31A.
(Process 2-1-2)

Next, the VM control apparatus 6 that creates the virtual machine 31A causes the virtual machine server 3A to hold the port information (FIG. 4C) of the virtual machine 31A, the virtual network ID (FIG. 4A), the virtual port ID (FIG. 4B), and the identifiers of the network control apparatuses (FIG. 7A).

The network control agent 32A detects these items of information and notifies the information to the physical configuration detection unit 12A of the network control apparatus 1A. The port information of the virtual port (ID: 0x1) has switch identification information of 0xa001 and the port number of 1, as shown in FIG. 4C.
(Process 2-1-3)

In the network control apparatus 1A, the physical configuration detection unit 12A (FIG. 8) processes the notification from the network control agent 32A. The physical configuration detection unit 12A determines whether or not the virtual port in question is in its own site from the notification from the network control agent 32A. More specifically, the network control apparatus identifier (FIG. 7A) is taken out and compared with the identifier of the network control apparatus 1A.
(Process 2-1-4)

As a result of the judgment above, the virtual port is determined to be in its own site, and the processing moves from the physical configuration detection unit 12A to the network equipment setting unit 13A.
(Process 2-1-5)

As in the first exemplary embodiment (1-1-7 in (Operation 1-1: Connection within a site)), the network equipment setting unit 13A sets up a network equipment (s) (switch(es), etc.) so that the port can only be connected to ports belonging to the same virtual network 5A.
(Operation 2-2: Extension)
(Process 2-2-1)

Then, the user creates the virtual port 52A (FIG. 2) belonging to the virtual network 5A for the network control apparatus 1A so as to connect the virtual machine 31B provided in the site B.
(Process 2-2-2)

Next, the VM control apparatus 6 that creates the virtual machine 31B causes the virtual machine server 3B to hold the port information of the virtual machine 31B, the virtual network ID, the virtual port ID, and the identifiers of the network control apparatuses.
(Process 2-2-3)

The network control agent 32B detects these items of information and notifies the information to the physical configuration detection unit 12B (FIG. 8) of the network control apparatus 1B. The port information of the virtual port (ID=0x1) has the switch identification information (the switch identifier) of 0xb0021, the port number (the port information) of 2, and the network control apparatus identifier of 10.10.0.2 as shown in FIG. 7B.
(Process 2-2-4)

The physical configuration detection unit 12B (FIG. 8) of the network control apparatus 1B determines whether or not the virtual port in question is in its own site from the network control apparatus identifier in the information notified by the network control agent 32B.

As a result of the judgment, since the virtual port is not in its own site, the physical configuration detection unit 12B notifies an extension request to the inter-site network cooperation control apparatus 4.

As shown in FIG. 9A, the content notified to the inter-site network cooperation control apparatus 4 as the extension request includes:

Identifier of the extension source network control apparatus;

Identifier of the extension destination network control apparatus;

Extension source virtual network ID;

Extension source virtual port ID; and

Port information (switch identifier, port number).
(Process 2-2-5)

The extension request processing unit 42 of the inter-site network cooperation control apparatus 4 receives the extension request from the physical configuration detection unit 12B, and acquires the site IDs of the extension source and the extension destination from, first, the information of the network control apparatuses and the sites (FIG. 7A) held in the extension information holding unit 41, and the network control apparatus identifiers of the extension source and the extension destination in the extension request.
(Process 2-2-6)

In the subsequent virtual network extension process, the port information is notified and the site is judged as in ((Process 2-1-2) and (Process 2-1-3) of Operation 2-1: Connection within a site) described above. Otherwise, the operation is identical to the first exemplary embodiment.
(Process 2-2-7)

The virtual port extension process thereafter is the same as in the first exemplary embodiment except for the method for notifying/storing the port information.

In the second exemplary embodiment, the extension request processing unit 42 of the inter-site network cooperation control apparatus 4 does not notify the port information to the physical configuration detection unit 12B of the network control apparatus 1B. The network control apparatus 1B stores the port information in the logical configuration holding unit 11B using the virtual port ID in the site B included in a response to the extension request.

As a result of the above, the extension request process is complete, and the virtual machines 31A and 31B are able to communicate with each other.

(Operation 2-3: Extension Release)

The following describes a process of releasing a virtual network extension in the second exemplary embodiment, when the virtual machine 31B is deleted, with reference to FIGS. 8, 9A, and 9B.

(Process 2-3-1)

After the virtual machine 31B and the port to which the virtual machine 31B is connected are deleted, the virtual machine control apparatus (the VM control apparatus) 6 deletes the port information of the virtual machine 31B from the virtual machine server 3B.

(Process 2-3-2)

The network control agent 32B detects the port information of the virtual machine 31B and sends a notification to delete the port to the network control apparatus 1B. This deletion notification includes port information (the switch identification information and the port number in FIG. 4C) of the virtual machine 31B, an extension source virtual port ID, and an extension source network control apparatus identifier (FIG. 7B).

(Process 2-3-3)

The network control apparatus 1B determines it to be in another site from this deletion notification and sends an extension release request shown in FIG. 9B to the inter-site network cooperation control apparatus 4.

(Process 2-3-4)

The extension request processing unit 42 of the inter-site network cooperation control apparatus 4 receives the extension release request transmitted by the network control agent 32B, refers to the extension information holding unit 41, acquires the IDs of the extension source site and the extension destination site from the network control apparatus identifiers and the site information of the extension destination site and the extension source site, and further acquires the virtual port IDs of the extension source site and the extension destination site from the virtual port extension information (FIG. 6B).

(Process 2-3-5)

First, the extension request processing unit 42 of the inter-site network cooperation control apparatus 4 returns the extension destination virtual port ID (FIG. 6B) defined in the site B to the network control apparatus 1B.

(Process 2-3-6)

The network control apparatus 1B changes the port deletion notification from the network control agent 32B to the extension destination virtual port ID defined in the site B, and continues the processing.

(Process 2-3-7)

The network equipment setting unit 13B of the network control apparatus 1B releases the connection setting for the network equipment(s) (not shown in the drawings) constituting the virtual network 5B, and deletes the port information (the entry having the virtual port ID of 0x2 in FIG. 5C) stored in the logical configuration holding unit 11B of the network control apparatus 1B.

(Process 2-3-8)

Next, the extension request processing unit 42 of the inter-site network cooperation control apparatus 4 performs processing of releasing the extension of the virtual port.

(Process 2-3-9)

The extension request processing unit 42 of the inter-site network cooperation control apparatus 4 sends a request to delete the virtual port (ID=0x2) to the network control apparatus 1B.

(Process 2-3-10)

In the network control apparatus 1B, the entry having the virtual port ID=0x2 is deleted from the virtual port information (FIG. 5B) registered in the logical configuration holding unit 11B.

(Process 2-3-11)

Upon receiving a response from the network control apparatus 1B, the extension request processing unit 42 of the inter-site network cooperation control apparatus 4 deletes the virtual port extension information (FIG. 6B: an entry having the extension ID of A1B1 and the extension destination virtual port ID=0x2) held in the extension information holding unit 41.

(Process 2-3-12)

Next, the extension request processing unit 42 of the inter-site network cooperation control apparatus 4 determines whether or not it is necessary to perform the processing of releasing a virtual network extension.

This can be determined by checking the presence of the entry having the extension ID of A1B1 in the virtual port extension information (FIG. 6B).

In this operation example, the virtual port extension information (the entry having the extension ID of A1B1 and the extension destination virtual port ID=0x2) has been deleted from the extension information holding unit 41.

Therefore, since there is no virtual port extended from the virtual network 5A (ID=0x1) in the site A to the virtual network 5B (ID=0x1) in the site B, the extension request processing unit 42 determines that the virtual network extension must be released.

(Process 2-3-13)

First, the tunnel control unit 44 of the inter-site network cooperation control apparatus 4 releases the tunnel connection between the tunnel apparatuses 2A and 2B and deletes the ports for the tunnel (for instance, closing ports opened for the tunnel of routers constituting the tunnel apparatuses).

(Process 2-3-14)

Further, the tunnel control unit 44 acquires the virtual port ID for the tunnel in each of the sites A and B from the information of virtual ports for a tunnel (FIG. 6C) in the extension information holding unit 41, and sends a port deletion notification to delete the virtual ports for the tunnel (53A and 51B in FIG. 2; FIG. 6C) to the network control apparatuses 1A and 1B.

(Process 2-3-15)

In the network control apparatuses 1A and 1B, the network equipment setting units 13A and 13B release the connection settings for the network equipment (not shown in the drawings) constituting the virtual networks 5A and 5B, and delete the following port information stored in the logical configuration holding units 11A and 11B.

Entry of virtual port ID=0x3 in the port information (the site A) in FIG. 4C

Entry of virtual port ID=0x1 in the port information (the site B) in FIG. 5C (Process 2-3-16)

Next, the logical network extension unit 43 of the inter-site network cooperation control apparatus 4 sends a request to delete the virtual ports for the tunnel ports to the network control apparatuses 1A and 1B.

(Process 2-3-17)

The following virtual port entries are deleted from the logical configuration holding units 11A and 11B of the network control apparatuses 1A and 1B.

Entry of virtual port ID=0x3 in the virtual port information (the site A) in FIG. 4B Entry of virtual port ID=0x1 in the virtual port information (the site B) in FIG. 5B (Process 2-3-18)

Then the following information items held in the extension information holding unit 41 of the inter-site network cooperation control apparatus 4 are deleted.

Information of virtual ports for a tunnel (FIG. 6C)

Virtual network extension information (FIG. 6A)

(Process 2-3-19)

The virtual machine control apparatus 6 sends the network control apparatus 1A a request to delete a virtual port.

(Process 2-3-20)

The following information is deleted from the virtual port information (the site A) (FIG. 4B) held in the logical configuration holding unit 11A of the network control apparatus 1A.

Information of a virtual port having a virtual port ID=0x2

(Effects)

As described, according to the second exemplary embodiment, in a case where the VM control apparatus registers mapping of a virtual port and a port in a virtual machine server, as added information of a physical port, a network control agent on the virtual machine server detects the registration to send notification to the network control apparatus, thus achieving the same effects as those in the first exemplary embodiment.

Exemplary Embodiment 3

Next, the third exemplary embodiment of the present invention will be described. In the third exemplary embodiment, VLAN is used as the virtual network technology in each site. A VLAN is configured by the network control agent 32 described in the second exemplary embodiment.

(Configuration)

Figure 10:
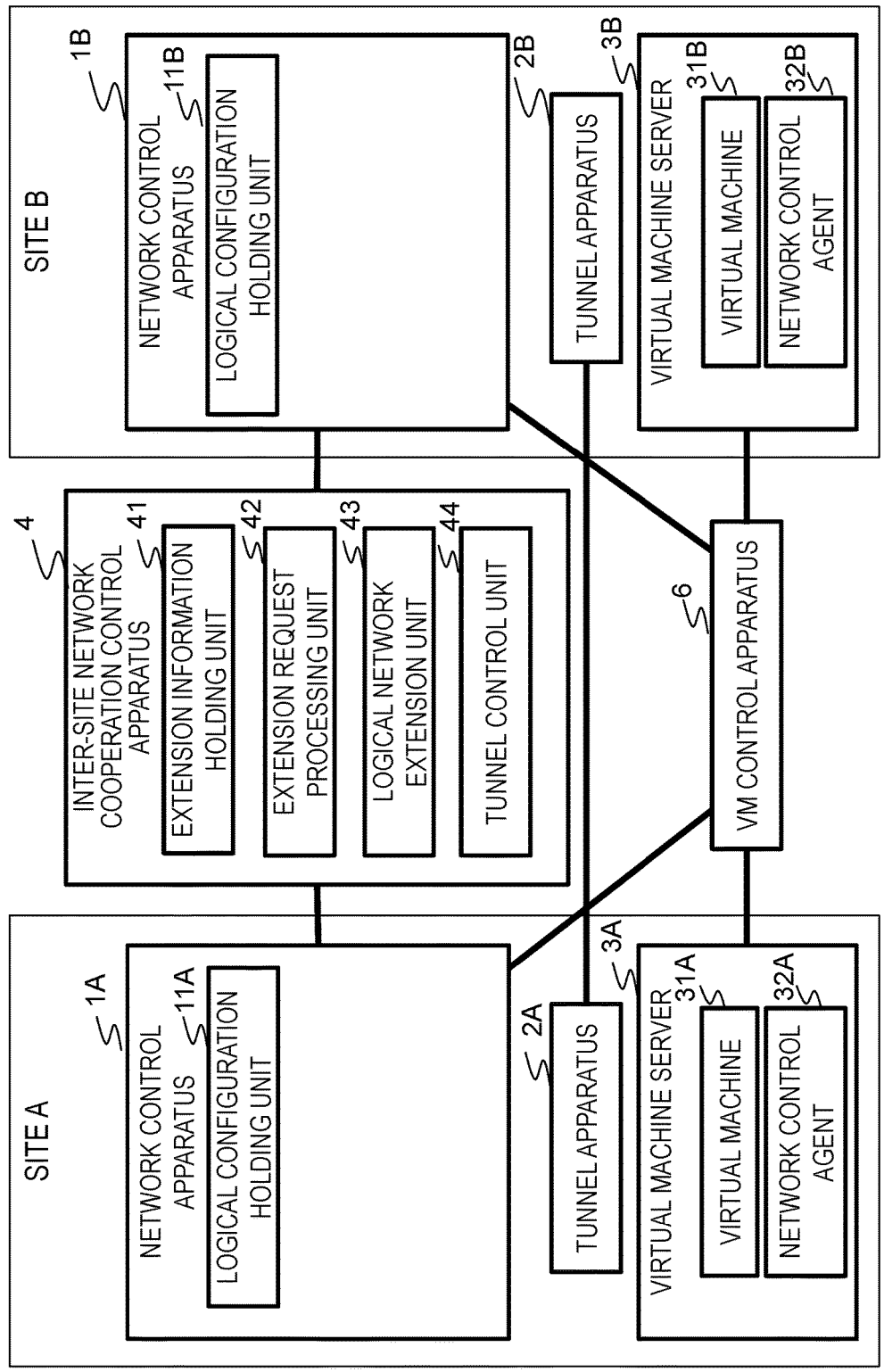
FIG. 10 is a diagram illustrating the configuration of a third exemplary embodiment of the present invention.

FIG. 10 is a diagram illustrating the configuration of the third exemplary embodiment. Compared with the second exemplary embodiment in FIG. 8, the physical configuration detection unit 12 and the network equipment setting unit 13 are deleted from each of the network control apparatuses in the third exemplary embodiment shown in FIG. 10, and the detection/setting functions same as those of the deleted elements are provided by the network control agent and the tunnel apparatus.

(Data Structure)

The data structure in the third exemplary embodiment does not have the port information in the logical configuration holding unit 11A in the second exemplary embodiment, but it holds network information that accompanies virtual network information shown in FIG. 10 instead. Further, since there is no other virtual network in this example, the VLAN number (10) happens to be the same in the sites A and B. The VLAN numbers in the sites A and B, however, do not have to be the same necessarily.

(Operation 3-1: Connection within a Site)

The following describes the operation of the third exemplary embodiment in detail, using an extension of a virtual network from the site A to the site B as an example.

(Process 3-1-1)

First, based on a request from a user, the virtual network 5A is created in the network control apparatus 1A. At this time, the logical configuration holding unit 11A creates a VLAN number in the site A while creating and holding the virtual network, and holds network information shown in FIG. 11A (virtual network ID and VLAN number).

(Process 3-1-2)

Next, based on a request from the user, the virtual port 51A is created in the network control apparatus 1A. The user designates the virtual port 51A as an NIC of the virtual machine 31A for the VM control apparatus 6 and requests the VM control apparatus 6 to create the virtual machine 31A.

(Process 3-1-3)

The VM control apparatus 6 that creates the virtual machine 31A causes the virtual machine server 3A to hold the port information of the virtual machine 31A (refer to FIG. 4C), the virtual network ID, the virtual port ID (FIG. 4B), and the network control apparatus identifier (refer to FIG. 7A) in a storage device thereof.

(Process 3-1-4)

The network control agent 32A detects these items of information and makes an inquiry to the network control apparatus 1A in its own site A about the VLAN number used by the virtual network 5A.

(Process 3-1-5)

The network control apparatus 1A determines the virtual network to be the one defined in its own site A since the network control apparatus identifier matches its own ID, then refers to the network information (virtual network ID, VLAN number) shown in FIG. 11A, and replies VLAN number: 10 assigned to the virtual network to the network control agent 32A.

(Process 3-1-6)

The network control agent 32A sets up a virtual machine server or virtual switches on the virtual machine server on the basis of this information so that the port participates in the VLAN having the VLAN number=10. As a result, this port can only be connected to other ports belonging to the VLAN having the VLAN number of 10.

(Operation 3-2: Extension)

(Process 3-2-1)

Then, the user creates the virtual port 52A (ID=0x2) belonging to the virtual network 5A for the network control apparatus 1A in order to connect the virtual machine 31B provided in the site B to the port.

(Process 3-2-2)

Next, the VM control apparatus that creates the virtual machine 31B causes the virtual machine server 3B to hold Virtual network ID;

Virtual port ID; and

Identifier of the network control apparatus 1A (10.10.0.2) in a form of these items of information associated with the port of the virtual machine 31B.

(Process 3-2-3)

The network control agent 32A detects these items of information and makes an inquiry to the network control apparatus 1B of the site thereof about a VLAN number used by this virtual network.

(Process 3-2-4)

In response to the inquiry from the network control agent 32A, the network control apparatus 1B determines that the virtual network is defined in another site, since the network control apparatus identifier (10.10.0.2) does not match its own identifier (10.11.0.2). The network control apparatus 1B notifies the inter-site network cooperation control apparatus 4 of an extension request shown in FIG. 11B.

(Process 3-2-5)

The extension request processing unit 42 of the inter-site network cooperation control apparatus 4 receives the extension request (FIG. 11B) from the network control apparatus 1B, and first acquires each site ID from the network control apparatus and site information (FIG. 7A) in the extension information holding unit 41 and the network control apparatus identifiers in the extension source and the extension destination of the extension request (FIG. 11B).

(Process 3-2-6)

In the subsequent virtual network extension process, after the processing (1-2-12 of Operation 1-2: Extension) in the first exemplary embodiment, the tunnel control unit 44 of the inter-site network cooperation control apparatus 4 creates ports to be connected to the virtual networks 5A and 5B in the tunnel apparatuses 2A and 2B in the sites, respectively, and connects a tunnel between these ports.

For instance, the following two methods A) and B) are examples of methods for configuring a network.

A) VLAN=10 is configured matching each of the created ports with the virtual network to which it belongs.

B) The tunnel apparatuses 2A and 2B are caused to hold the information of the created ports, as the virtual machine control apparatus 6, and the network control agents 32A and 32B detect the information and set up the network.

(Process 3-2-7)

In the subsequent virtual port extension process, the process (1-2-16 of Operation 1-2: Extension) of the first exemplary embodiment is performed. The virtual port ID (0x2) in the site B obtained as a result of this is returned to the network control apparatus 1B as a response to the extension request.

(Process 3-2-8)

The network control apparatus 1B acquires the virtual network ID and the VLAN number from this virtual port ID and replies to the inquiry from the network control agent 32A (Process 3-1-3 of Operation 3-1: Connection within a site).

(Process 3-2-9)

As in (Process 3-1-3 of Operation 3-1: Connection within a site), the network control agent 32A sets up a virtual machine server or virtual switches on the virtual machine server.

(Process 3-2-10)

As a result, the extension request process is complete, and the virtual machines 31A and 31B are able to communicate with each other.

(Operation 3-3: Extension Release)

A process of releasing a virtual network extension when the virtual machine 31B is deleted is the same as (Operation 2-3: Extension Release) in the second exemplary embodiment. Therefore, explanation will be omitted.

(Effects)

As described, according to the third exemplary embodiment, the same effects as those in the first and the second exemplary embodiments can be obtained by applying the present invention to a case where a network virtualization technology using a VLAN is utilized.

Further, the disclosure of each Patent Literature and Non-Patent Literature cited above is incorporated herein in its entirety by reference thereto. It should be noted that other objects, features and aspects of the present invention will become apparent in the entire disclosure and that modifications may be done without departing the gist and scope of the present invention as disclosed herein and claimed as appended herewith. Also it should be noted that any combination of the disclosed and/or claimed elements, matters and/or items may fall under the modifications. Particularly, the ranges of the numerical values used in the present description should be interpreted as a specific numeric value or small range included in these ranges even in cases where no explanation is provided.

The invention claimed is:

1. A network system comprising:
a plurality of sites, each of the sites including:
   a network control apparatus that provides a virtual network service; and
   a tunnel apparatus that performs tunneling between sites with a corresponding tunnel apparatus in another site; and
an inter-site network cooperation control apparatus that connects at least to the network control apparatus in an extension source site of a virtual network and the network control apparatus in an extension destination site thereof,
wherein the network control apparatus includes:
a logical configuration holding unit that holds information related to affiliation of the virtual network and a virtual port that is a port on a logical configuration of the virtual network;
a configuration detection unit that in response to an operation performed on a network configuration including at least one of the virtual network and the virtual port, determines whether the operation on the network configuration is a process within the site thereof or an extension process of a virtual network to cross sites by referring to information held in the logical configuration holding unit; and
a network equipment setting unit that sets up one or more network equipments in a site, wherein the network control apparatus in the extension source site or in the extension destination site notifies an extension request to the inter-site network cooperation control apparatus, when the network control apparatus determines operation on the network configuration to be an extension of a virtual network across sites, wherein
the inter-site network cooperation control apparatus includes:
an extension information holding unit that holds:
   information of a virtual network extending into another site;
   information of a virtual port extending into another site; and
   information of a virtual port for a tunnel;
an extension request processing unit that upon reception of the extension request, issues an inquiry to the extension information holding unit on whether or not the virtual network is extended into another site and is registered,
a logical network extension unit that, when no virtual network extension is registered, notifies the network control apparatus in the extension destination site of an instruction to create a virtual network in the extension destination site, necessary for configuring the extension of a virtual network across sites, and further notifies each of the network control apparatuses in the extension destination site and the extension source site of an instruction to create a virtual port for a tunnel between sites; and
a tunnel control unit that creates a port that connects to the virtual network in each site and that connects a tunnel between the ports on the tunnel apparatus, and wherein
virtual networks in the extension source site and the extension destination site are communicatively connected via the virtual ports for a tunnel between sites that are created in the tunnel apparatuses in respective sites, and the tunnel between the extension source and extension destination sites.

2. The network system according to claim 1, wherein the inter-site network cooperation control apparatus comprises:
the extension request processing unit that upon reception of an extension release request related to the extension of a virtual network across sites from the network control apparatus, performs extension releasing processing of the virtual network across sites;
the tunnel control unit that deletes a port that connects to the virtual network in each site and that connects a tunnel between the ports on the tunnel apparatus; and
the logical network extension unit that instructs the network control apparatus in the extension destination site to delete a virtual port for a tunnel, and that deletes the information of the extended virtual network and virtual port in the extension information holding unit.

3. The network system according to claim 2, further comprising:
a network control agent that acquires information of a virtual network and/or virtual port created in a site and notifies a corresponding network control apparatus of the information acquired, wherein
the network control apparatus comprises
a logical configuration holding unit that holds information related to the affiliation of a virtual network and virtual port, and wherein
the network control agent performs processing of notifying the inter-site network cooperation control apparatus of configuration information on another site and setting up one or more network equipments in a site.

4. A network system comprising:
a plurality of sites, each of the sites including:
a network control apparatus that provides a virtual network service; and
a tunnel apparatus that performs tunneling between sites with a corresponding tunnel apparatus in another site; and
an inter-site network cooperation control apparatus that connects at least to the network control apparatus in an extension source site of a virtual network and the network control apparatus in an extension destination site thereof, wherein
the network control apparatus in the extension source site or in the extension destination site notifies an extension request to the inter-site network cooperation control apparatus, upon detection of an extension of a virtual network across sites in response to an operation performed on a network configuration including at least one of a virtual network and a virtual port that is a port on a logical configuration of the virtual network, wherein
the inter-site network cooperation control apparatus, upon reception of the extension request, notifies the network control apparatus in the extension destination site of an instruction to create a virtual network in the extension destination site, necessary for configuring the extension of a virtual network across sites, and further notifies each of the network control apparatuses in the extension destination site and the extension source site of an instruction to create a virtual port for a tunnel between sites, and wherein
virtual networks in the extension source site and the extension destination site are communicatively connected via the virtual ports for a tunnel between sites that are created in the tunnel apparatuses in respective sites, and the tunnel between the extension source and extension destination sites,
wherein the inter-site network cooperation control apparatus comprises:
an extension request processing unit that upon reception of the extension request from the network control apparatus or an extension release request related to the extension of a virtual network across sites, performs extension processing or extension releasing processing of the virtual network across sites;
a tunnel control unit that creates or deletes a port that connects to the virtual network in each site and that connects a tunnel between the ports on the tunnel apparatus;
an extension information holding unit that holds extension information including at least information of the extended virtual network and virtual port; and
a logical network extension unit that instructs the network control apparatus in the extension destination site to create a virtual network and create or delete a virtual port for a tunnel, and that registers or deletes the information of the extended virtual network and virtual port in the extension information holding unit, wherein the network control apparatus comprises:
a logical configuration holding unit that holds information related to affiliation of the virtual network and the virtual port;
a configuration detection unit that determines whether or not an operation on the network configuration is a process within the site thereof by referring to the information held in the logical configuration holding unit, and that notifies the inter-site network cooperation control apparatus of the extension request when determined to be an extension process of a virtual network to another site; and
a network equipment setting unit that sets up one or more network equipments in a site.

5. The network system according to claim 4, wherein the network control apparatus notifies an extension request to the inter-site network cooperation control apparatus when the configuration detection unit detects configuration information relating to a virtual port that has been set up in another site or a port that is controlled in another site,
the extension request processing unit, upon reception of the extension request from the network control apparatus in the inter-site network cooperation control apparatus, identifies an extension destination site, and inquires to the extension information holding unit about whether a corresponding virtual network is created in the network control apparatus in the extension destination site, and the logical network extension unit instructs the network control apparatus in the extension destination site to create a virtual network and a virtual port for a tunnel for connecting the virtual network when the virtual network is not created, and
the inter-site network cooperation control apparatus, after the extension of the virtual network, further requests the network control apparatus in the extension destination to create a virtual port in the extension destination site corresponding to a virtual port in the extension source site included in the extension request, and associates port information of the virtual port in the extension source site with the virtual port created in the extension destination site.

6. The network system according to claim 4, further comprising
   a network control agent that acquires information of a virtual network and/or virtual port created in a site and notifies a corresponding network control apparatus of the information acquired.

7. A network control method, comprising:
   providing an inter-site network cooperation control apparatus that connects at least to a network control apparatus in an extension source site of a virtual network and a network control apparatus in an extension destination site thereof, each of the extension source and destination sites including at least the network control apparatus that provides a virtual network service and a tunnel apparatus that provides tunneling between sites with a corresponding tunnel apparatus in another site;
   notifying an extension request to the inter-site network cooperation control apparatus, by the network control apparatus in the extension source site, upon detection of an extension of a virtual network across sites in response to an operation performed on a network configuration including at least one of a virtual network and a virtual port that is a port on a logical configuration of the virtual network;
   notifying, by the inter-site network cooperation control apparatus, the network control apparatus in the extension destination site of an instruction to create a virtual network in the extension destination site, necessary for configuring the extension of a virtual network across sites, based on the extension request, and further notifying, by the inter-site network cooperation control apparatus, the network control apparatuses in the extension destination site and the extension source site of an instruction to create virtual ports for a tunnel between sites; and
   establishing a communication connection between virtual networks in the extension source site and the extension destination site via the virtual ports for tunnel between sites that are created in the tunnel apparatuses in respective sites and the tunnel between the extension source and extension destination sites, the method further comprising:
   determining, by the network control apparatus, whether or not an operation on the network configuration is a process within the site thereof by referring to information held in a logical configuration holding unit that holds information related to affiliation of the virtual network and the virtual port;
   notifying, by the network control apparatus, the inter-site network cooperation control apparatus of the extension request when determined to be an extension process of a virtual network to another site.

8. The network control method according to claim 7, comprising:
   notifying, by the network control apparatus, the extension request to the inter-site network cooperation control apparatus when detecting configuration information in the logical configuration holding unit relating to a virtual port that has been set up in another site or a port that is controlled in another site;
   upon reception of the extension request from the network control apparatus, identifying, by the inter-site network cooperation control apparatus, an extension destination site, and inquiring to the extension information holding unit about whether a corresponding virtual network is created in the network control apparatus in the extension destination site, and instructing, by the inter-site network cooperation control apparatus, the network control apparatus in the extension destination site to create a virtual network and a virtual port for a tunnel for connecting the virtual network when the virtual network is not created; and
   after the extension of the virtual network, requesting, by the inter-site network cooperation control apparatus, further the network control apparatus in the extension destination to create a virtual port in the extension destination site corresponding to a virtual port in the extension source site included in the extension request, and associating port information of the virtual port in the extension source site with the virtual port created in the extension destination site.

9. The network control method according to claim 7, comprising:
   acquiring, by a network control agent, information of a virtual network and/or virtual port created in a site; and
   notifying, by a network control agent, a corresponding network control apparatus of the information acquired.

* * * * *